(12) United States Patent
Pike et al.

(10) Patent No.: US 11,683,172 B2
(45) Date of Patent: Jun. 20, 2023

(54) DISTRIBUTED SECURE COMMUNICATION SYSTEM

(71) Applicant: Dell Products L.P., Round Rock, TX (US)

(72) Inventors: Jimmy D. Pike, Georgetown, TX (US); Gaurav Chawla, Austin, TX (US); William Price Dawkins, Lakeway, TX (US); Mark Steven Sanders, Roanoke, VA (US); Elie Jreij, Pflugerville, TX (US); Robert W. Hormuth, Cedar Park, TX (US); Mukund P. Khatri, Austin, TX (US); Walter A. O'Brien, III, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 17/079,737

(22) Filed: Oct. 26, 2020

(65) Prior Publication Data

US 2022/0131695 A1    Apr. 28, 2022

(51) Int. Cl.
  *H04L 29/06* (2006.01)
  *H04L 9/32* (2006.01)
  (Continued)

(52) U.S. Cl.
  CPC ............ *H04L 9/32* (2013.01); *H04L 9/14* (2013.01); *H04L 9/30* (2013.01)

(58) Field of Classification Search
  CPC ............. H04L 9/32; H04L 9/14; H04L 9/30
  (Continued)

(56) References Cited

U.S. PATENT DOCUMENTS 8,538,028 B2   9/2013   Yeap et al.
8,843,994 B2   9/2014   Tandon
(Continued)

FOREIGN PATENT DOCUMENTS

CN   109922080 A    6/2019
CN   110430204 A   11/2019
(Continued)

OTHER PUBLICATIONS

PCT International Search Report and Written Opinion, Application No. PCT/US2021/029752, dated Jul. 27, 2021, 16 pages.
(Continued)

*Primary Examiner* — Jeffrey C Pwu
*Assistant Examiner* — Samuel Ambaye
(74) *Attorney, Agent, or Firm* — Joseph Mencher

(57) ABSTRACT

A distributed secure communication system includes a first System Control Processor (SCP) subsystem coupled to second and third SCP subsystems via a network. The first SCP subsystem identifies the second SCP subsystem, signs a first SCP authentication communication with a first private key to provide a first signed SCP authentication communication that it transmits to the second SCP subsystem. The first SCP subsystem receives a second signed SCP authentication communication from the second SCP subsystem, authenticates the second signed SCP authentication communication using a second public key associated with the second SCP subsystem and, in response, establishes a first secure communication channel with the second SCP subsystem. The first SCP subsystem then receives an attestation of an authentication of the third SCP subsystem from the second SCP subsystem and, in response, establishes a second secure communication channel with the third SCP subsystem without the transmission of signed SCP authentication communications.

20 Claims, 14 Drawing Sheets

(51) Int. Cl.
*H04L 9/14* (2006.01)
*H04L 9/30* (2006.01)

(58) Field of Classification Search
USPC .......................................................... 713/155
See application file for complete search history.

(56) References Cited

U.S. PATENT DOCUMENTS

| | | | |
|---|---|---|---|
| 9,444,823 B2 | 9/2016 | Narayanan et al. | |
| 2016/0344710 A1* | 11/2016 | Khan | H04L 63/061 |
| 2019/0149539 A1* | 5/2019 | Scruby | H04L 63/0838 |
| | | | 713/168 |

FOREIGN PATENT DOCUMENTS

| | | |
|---|---|---|
| JP | 2005267520 A | 9/2005 |
| TW | I575969 B | 3/2017 |

OTHER PUBLICATIONS

English Translation of Search Report of Taiwan Patent Application No. 110125109, Date of Completion: May 10, 2022, 1 Page.

* cited by examiner

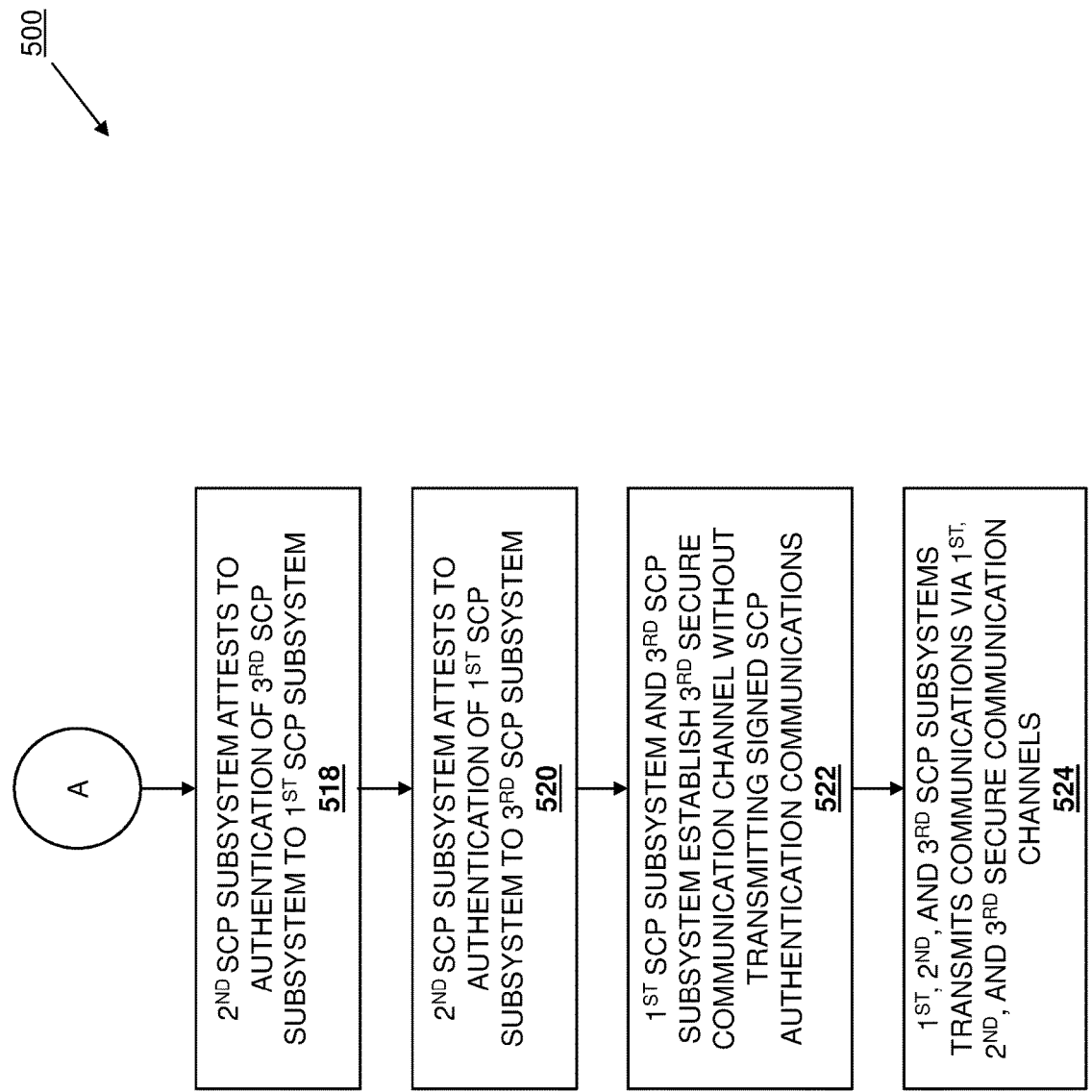

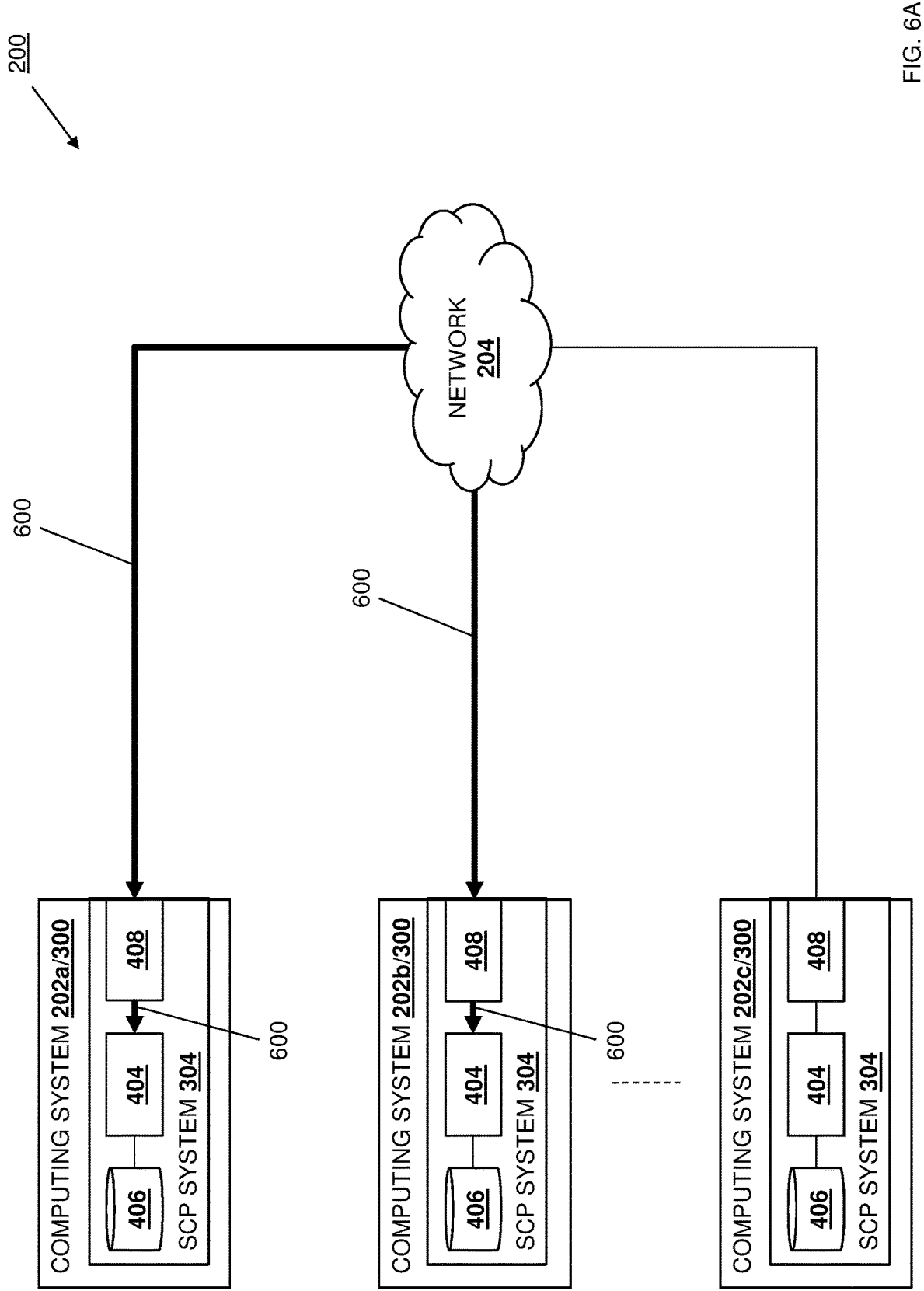

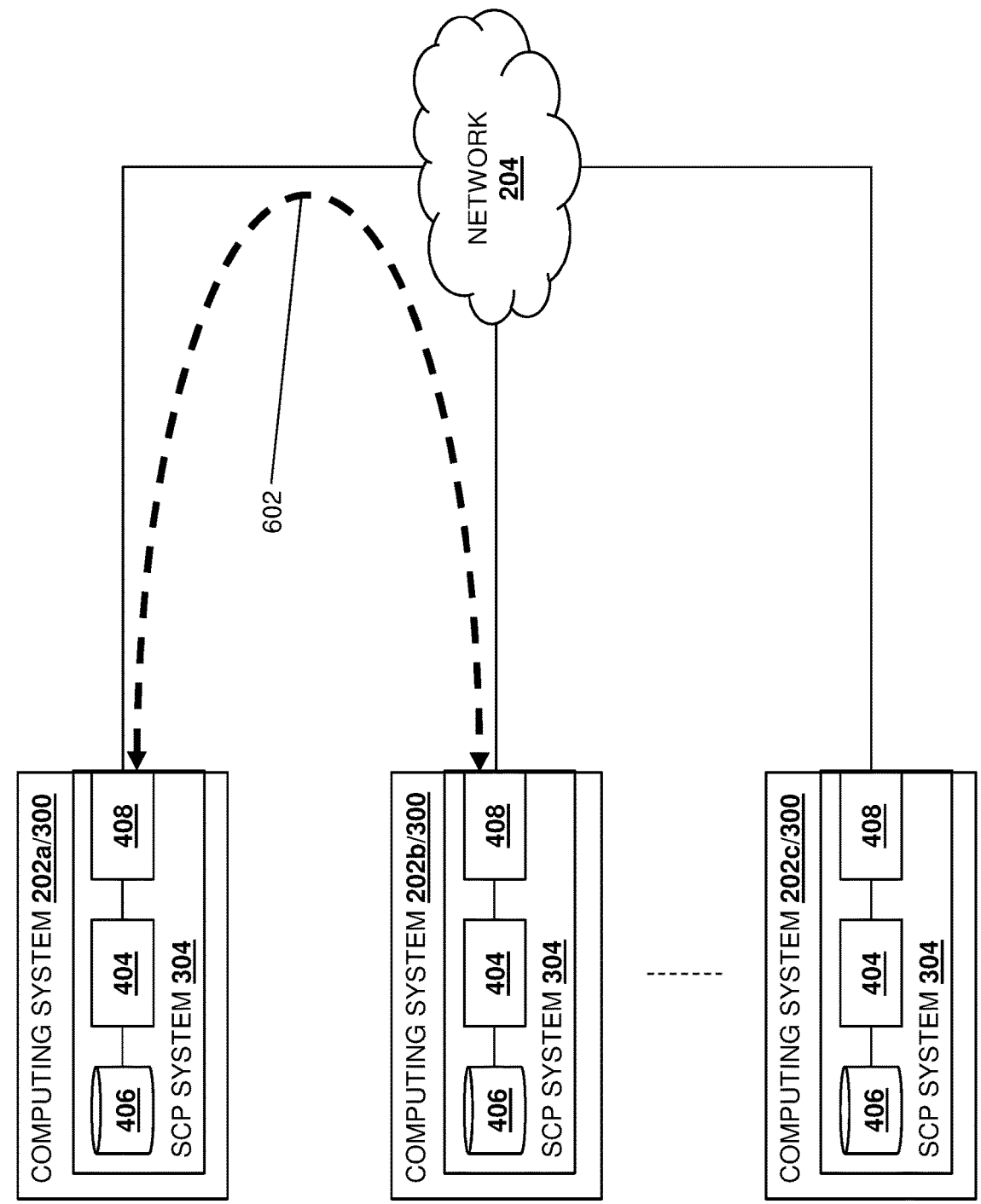

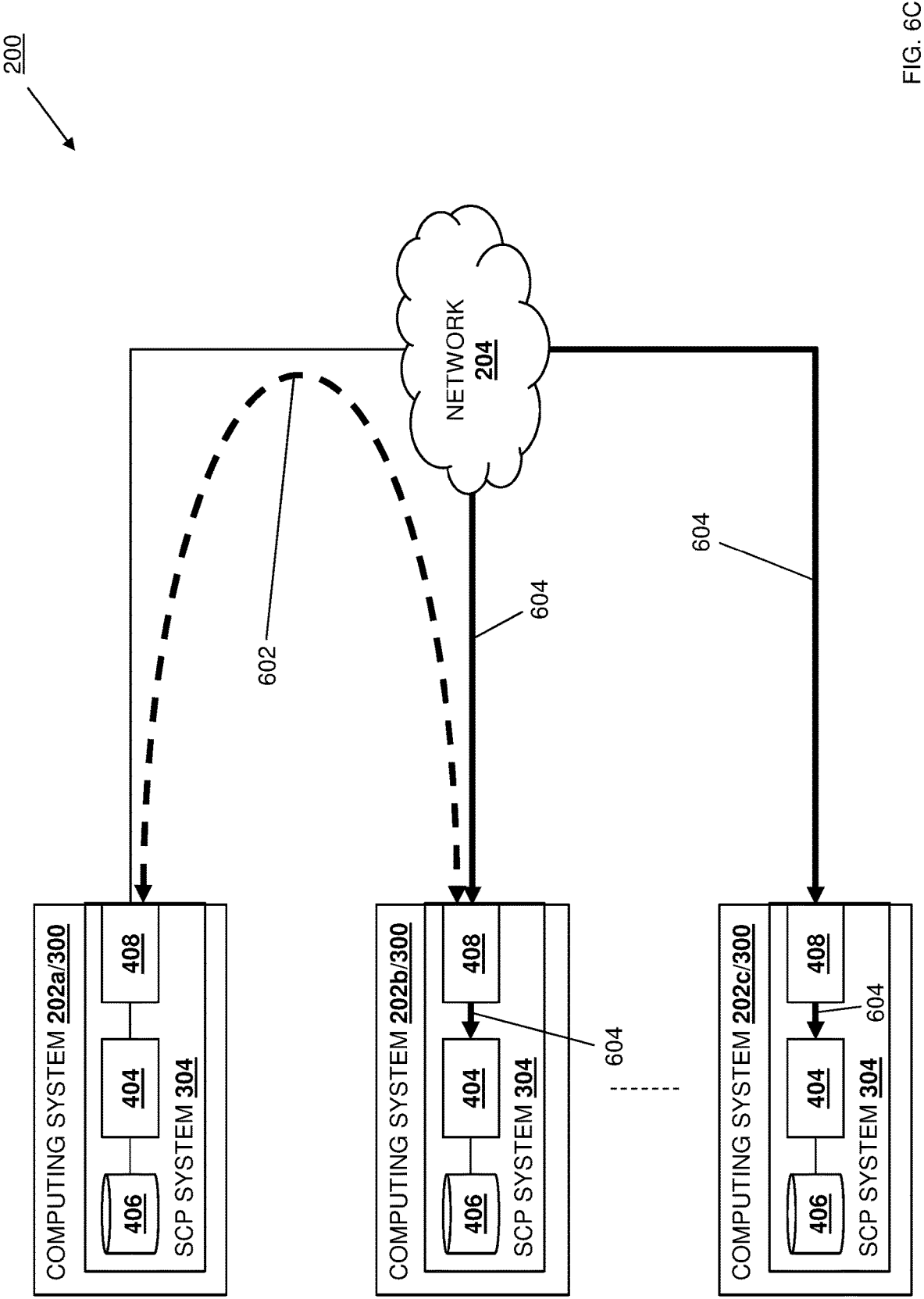

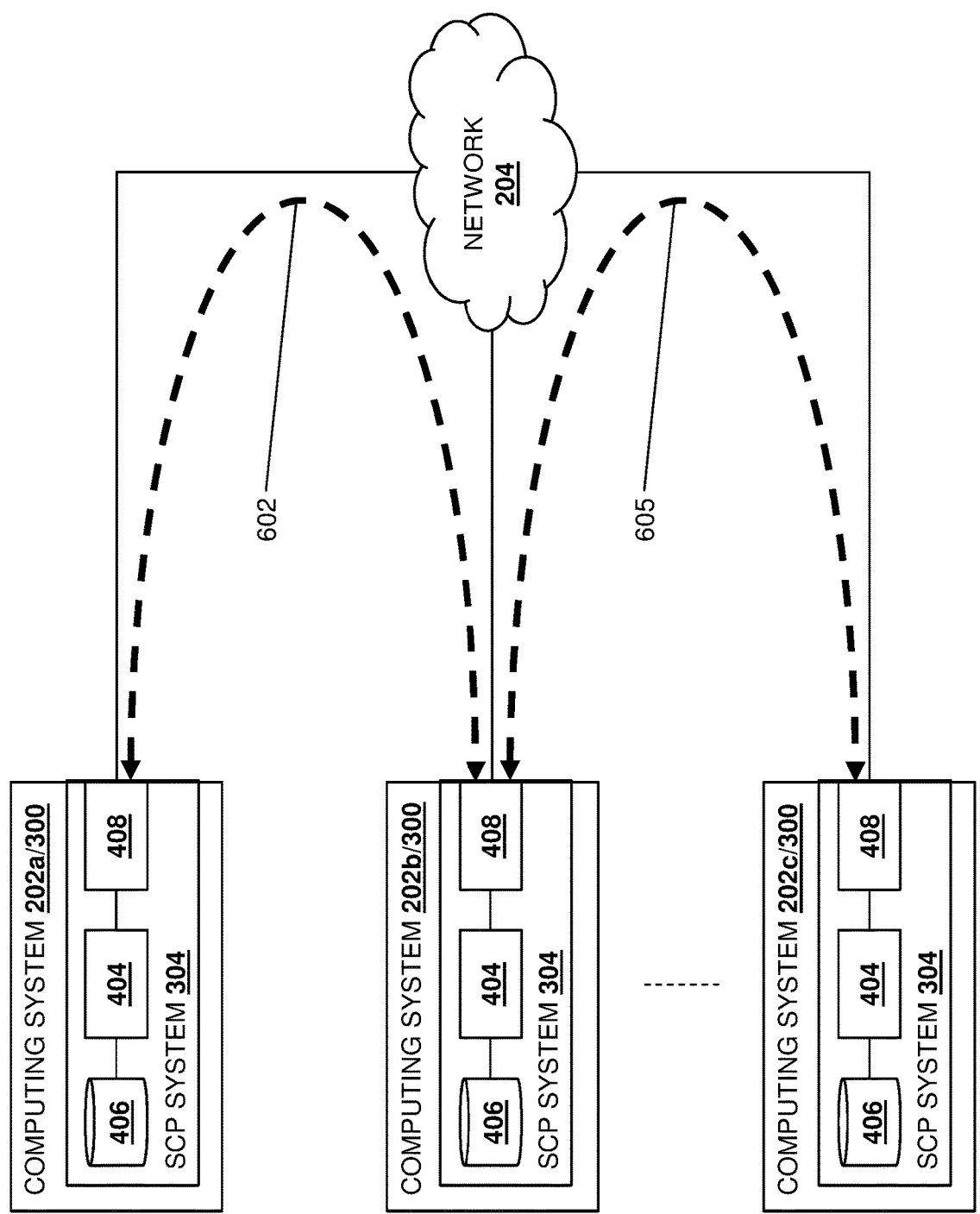

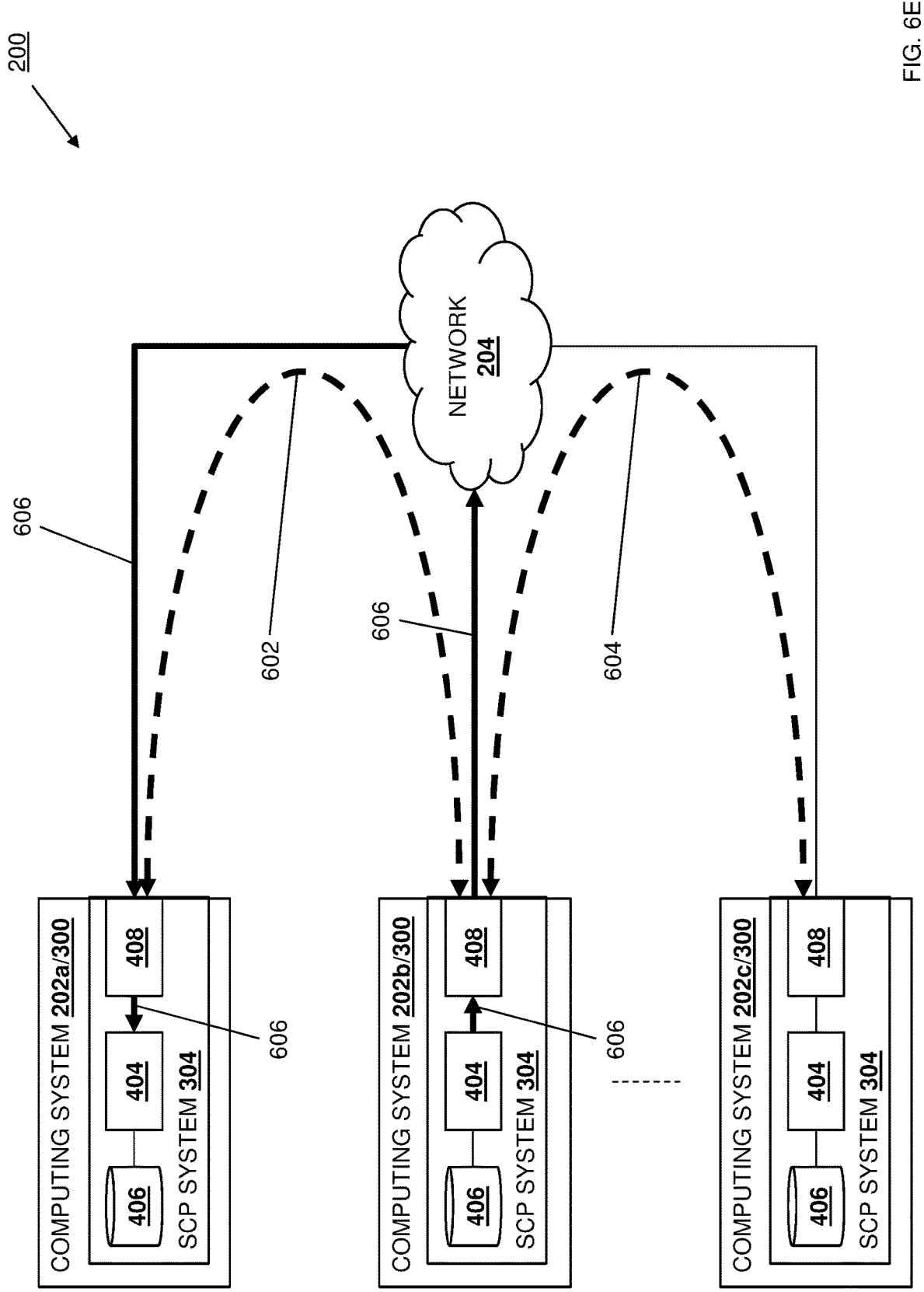

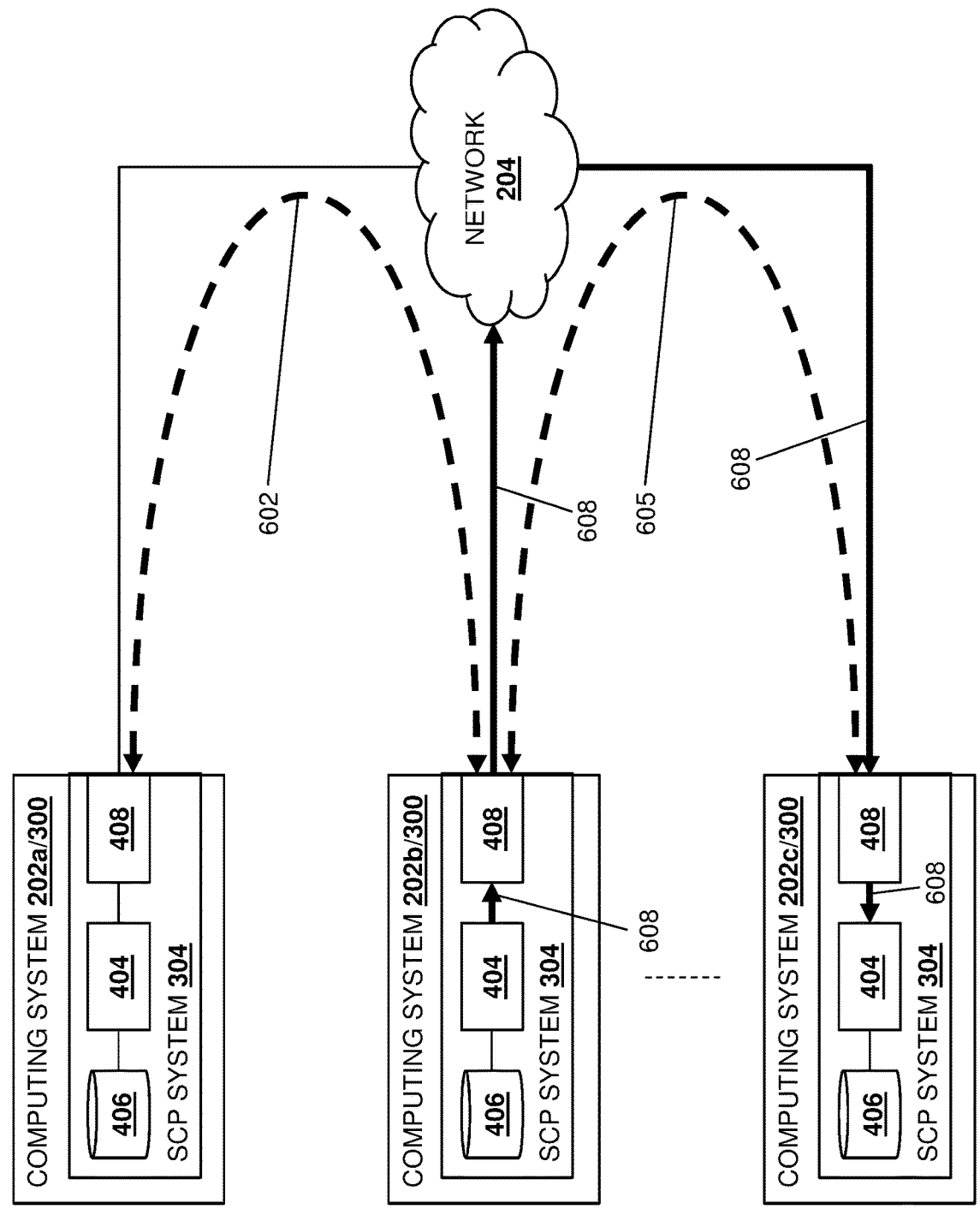

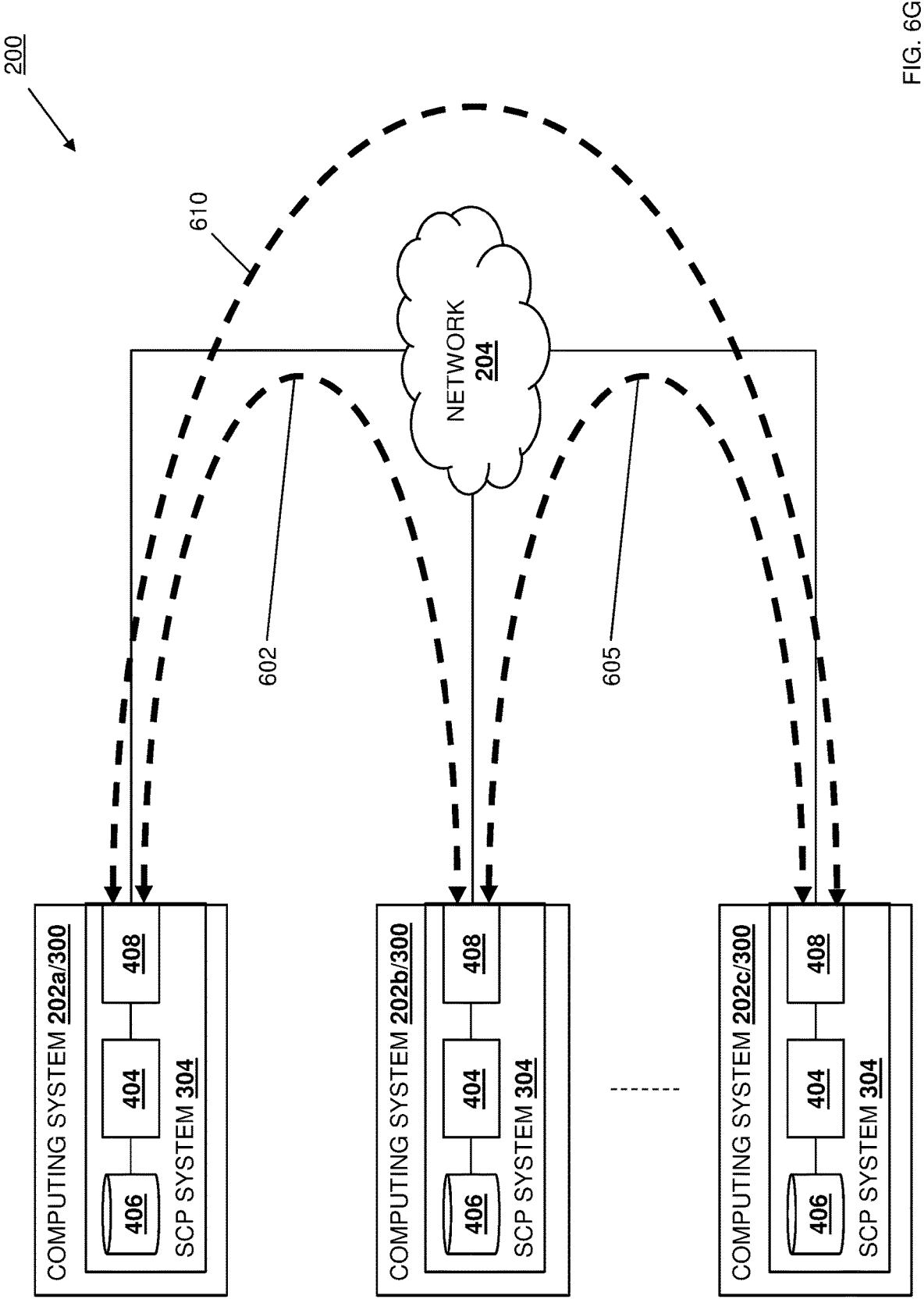

DISTRIBUTED SECURE COMMUNICATION SYSTEM

BACKGROUND

The present disclosure relates generally to information handling systems, and more particularly to providing secure communications between information handling systems in a distributed manner.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may be configured to communicate with each other via secure communication channels. For example, Baseboard Management Controller (BMC) subsystems in server devices (e.g., the integrated DELL® Remote Access Controller (iDRAC) subsystem provided in server devices available from DELL® Inc. of Round Rock, Tex., United States) may operate to configure secure communication channels between each other for use in securely exchanging data. However, such conventional secure communications channel configuration systems require the BMC subsystems in any two server devices between which secure communications will be exchanged to perform authentication operations with each other in order to authenticate each other before the secure communication channel between the two will be established, which is time consuming, only handles the communications channel between two subsystem devices, and has been found by the inventors of the present disclosure to result in the performance of unnecessary, duplicative authentication operations.

Accordingly, it would be desirable to provide a secure communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a distributed secure communication engine that is configured to: identify a second System Control Processor (SCP) subsystem and, in response, sign a first SCP authentication communication with a first private key to provide a first signed SCP authentication communication; transmit the first signed SCP authentication communication to the second SCP subsystem; receive a second signed SCP authentication communication from the second SCP subsystem and, in response, authenticate the second signed SCP authentication communication using a second public key associated with the second SCP subsystem; establish, in response to authenticating the second signed SCP authentication communication, a first secure communication channel with the second SCP subsystem; receive, from the second SCP subsystem, an attestation of an authentication of a third SCP subsystem and, in response, establish a second secure communication channel with the third SCP subsystem without the transmission of signed SCP authentication communications.

BRIEF DESCRIPTION OF THE DRAWINGS

FIG. 5B is a flow chart illustrating an embodiment of a portion of a method for providing distributed secure communications.

FIG. 6A is a schematic view illustrating an embodiment of the networked system of FIG. 2 with the computing system 300 of FIG. 3 having the SCP subsystem of FIG. 4 and operating during the method of FIG. 5.

FIG. 6B is a schematic view illustrating an embodiment of the networked system of FIG. 2 with the computing system 300 of FIG. 3 having the SCP subsystem of FIG. 4 and operating during the method of FIG. 5.

FIG. 6C is a schematic view illustrating an embodiment of the networked system of FIG. 2 with the computing system 300 of FIG. 3 having the SCP subsystem of FIG. 4 and operating during the method of FIG. 5.

FIG. 6D is a schematic view illustrating an embodiment of the networked system of FIG. 2 with the computing system 300 of FIG. 3 having the SCP subsystem of FIG. 4 and operating during the method of FIG. 5.

FIG. 6E is a schematic view illustrating an embodiment of the networked system of FIG. 2 with the computing system 300 of FIG. 3 having the SCP subsystem of FIG. 4 and operating during the method of FIG. 5.

FIG. 6F is a schematic view illustrating an embodiment of the networked system of FIG. 2 with the computing system 300 of FIG. 3 having the SCP subsystem of FIG. 4 and operating during the method of FIG. 5.

FIG. 6G is a schematic view illustrating an embodiment of the networked system of FIG. 2 with the computing system 300 of FIG. 3 having the SCP subsystem of FIG. 4 and operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
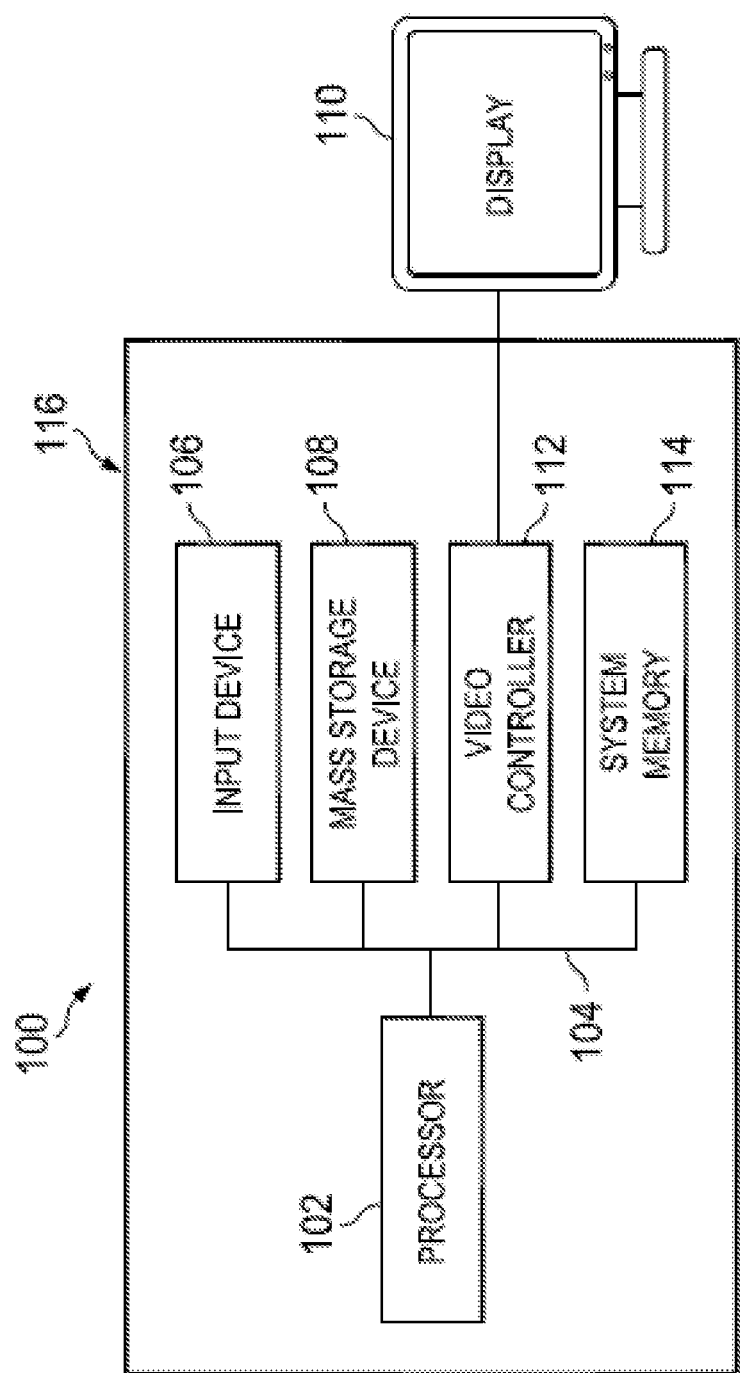
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
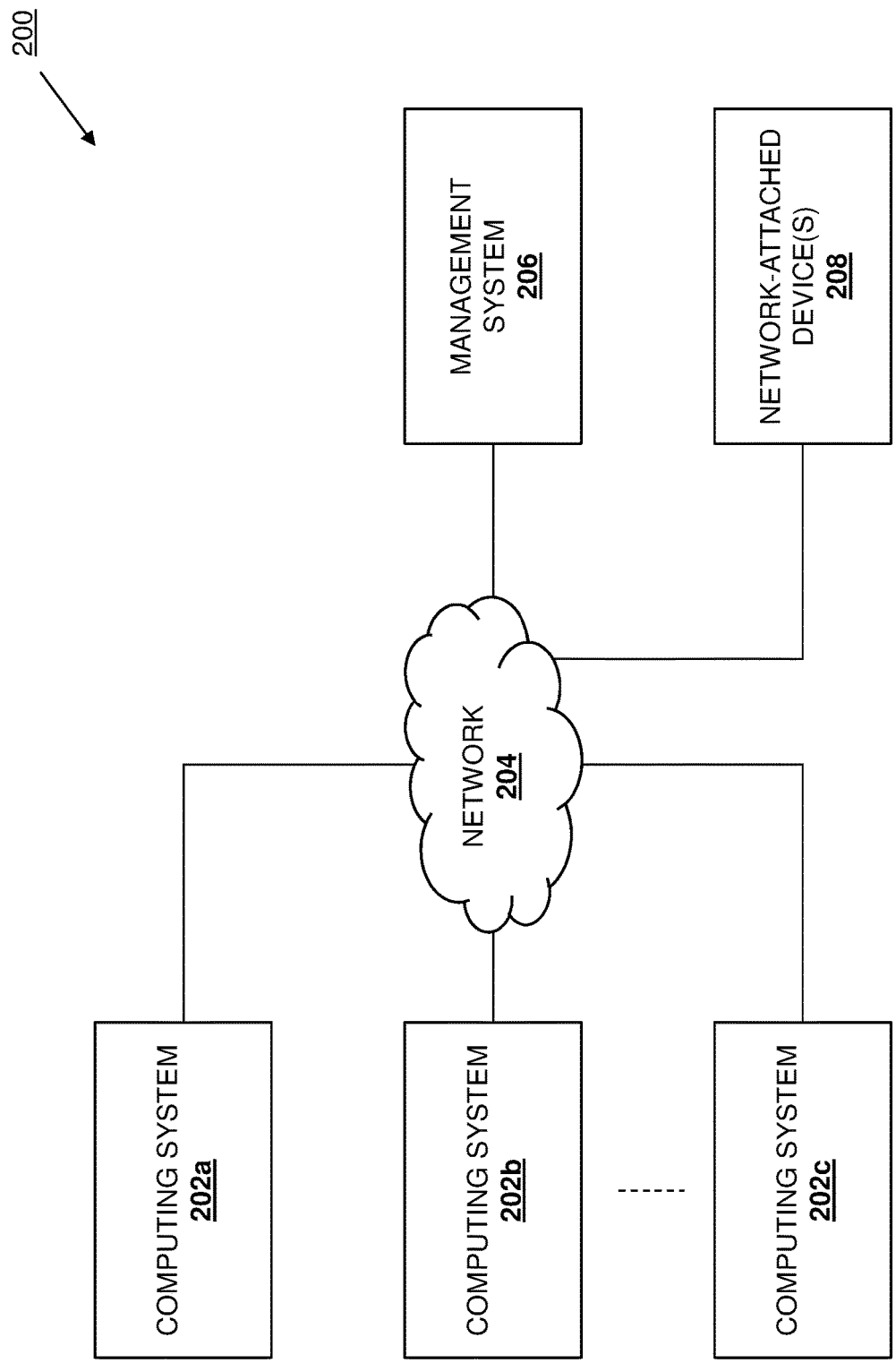
FIG. 2 is a schematic view illustrating an embodiment of a networked system.

Referring now to FIG. 2, an embodiment of a networked system 200 is illustrated in which the distributed secure communication system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c (e.g., an SCP manager for the SCP subsystems included in the computing systems 202a-202c discussed below, etc.). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the distributed secure communication system of the present disclosure may be utilized with a variety of components and component configurations, and/or may be provided in a variety of computing system/network configurations, while remaining within the scope of the present disclosure as well.

Figure 3A:
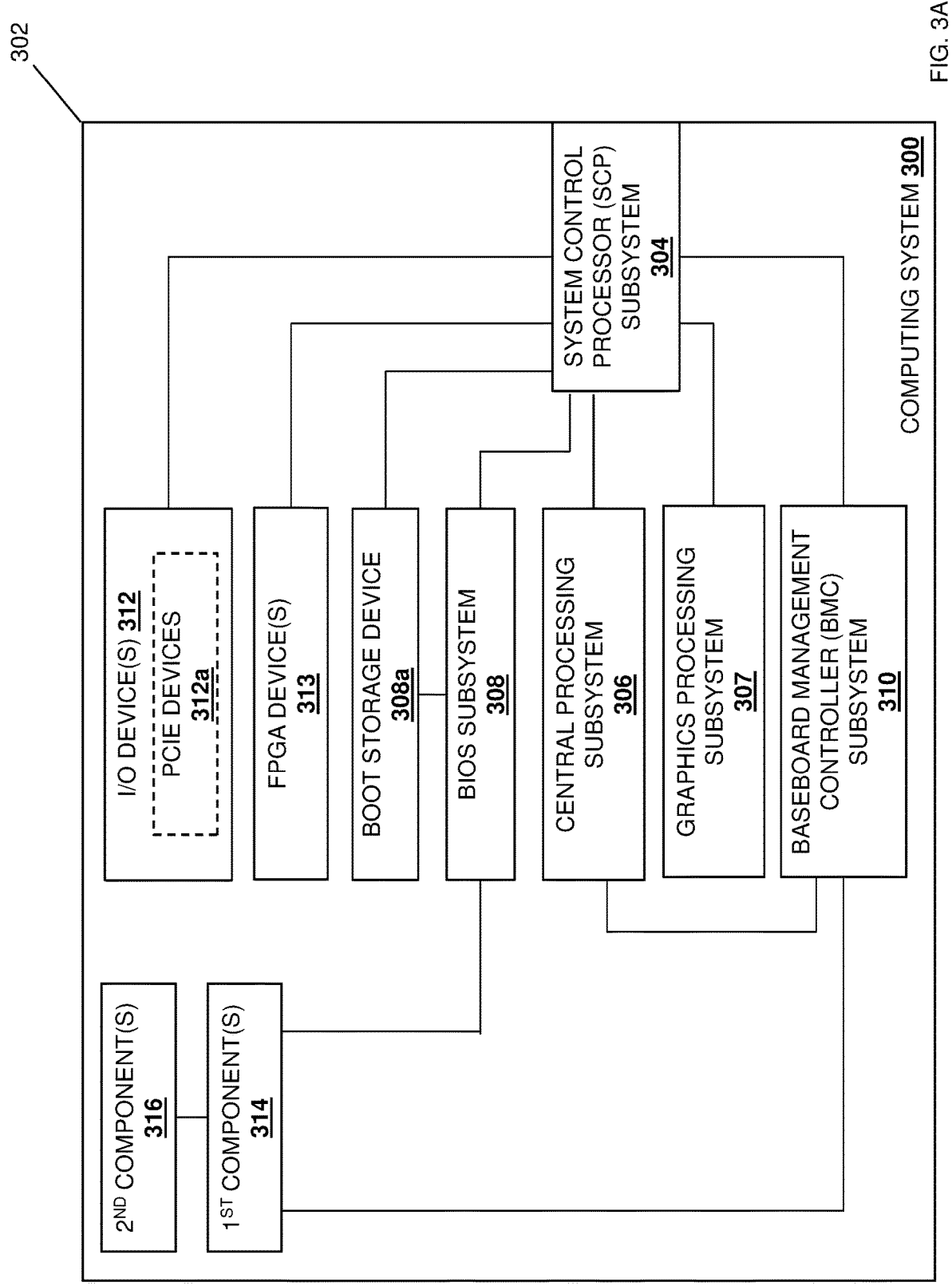
FIG. 3A is a schematic view illustrating an embodiment of a computing system that may be included in the networked system of FIG. 2 and that may utilize the distributed secure communication system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated below.

For example, the chassis 302 may house a System Control Processor (SCP) subsystem 304 that is provided according to the teachings of the present disclosure to perform the distributed secure communication functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, and/or the distributed key management functionality described by the inventors of the present disclosure in U.S. patent application Ser. No. 17/071,268, filed on Oct. 15, 2020, the disclosures of which are incorporated herein by reference in their entirety. However, while illustrated and described as an enhanced SmartNIC device provided by an SCP subsystem, one of skill in the art in possession of the present disclosure will appreciate that the SCP subsystem 304 may be replaced by a variety of other subsystems that are configured to perform the functionality discussed below while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304 and the BIOS subsystem 308, and that one of skill in the art in possession of the present disclosure will recognize may store a boot image that may be accessible to and utilized by the BIOS subsystem 308 during boot operations. For example, the boot storage device 308a may be provided by Boot Optimized Storage Solution (BOSS) available from DELL® Inc. of Round Rock, Tex., United States, although other boot storage devices will fall within the scope of the present disclosure as well. In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device(s) 313 that are coupled to the SCP subsystem 304, and that as discussed below may be programmed to perform any of a variety of functions for the computing system 300 and/or the SCP subsystem 304.

Figure 3B:
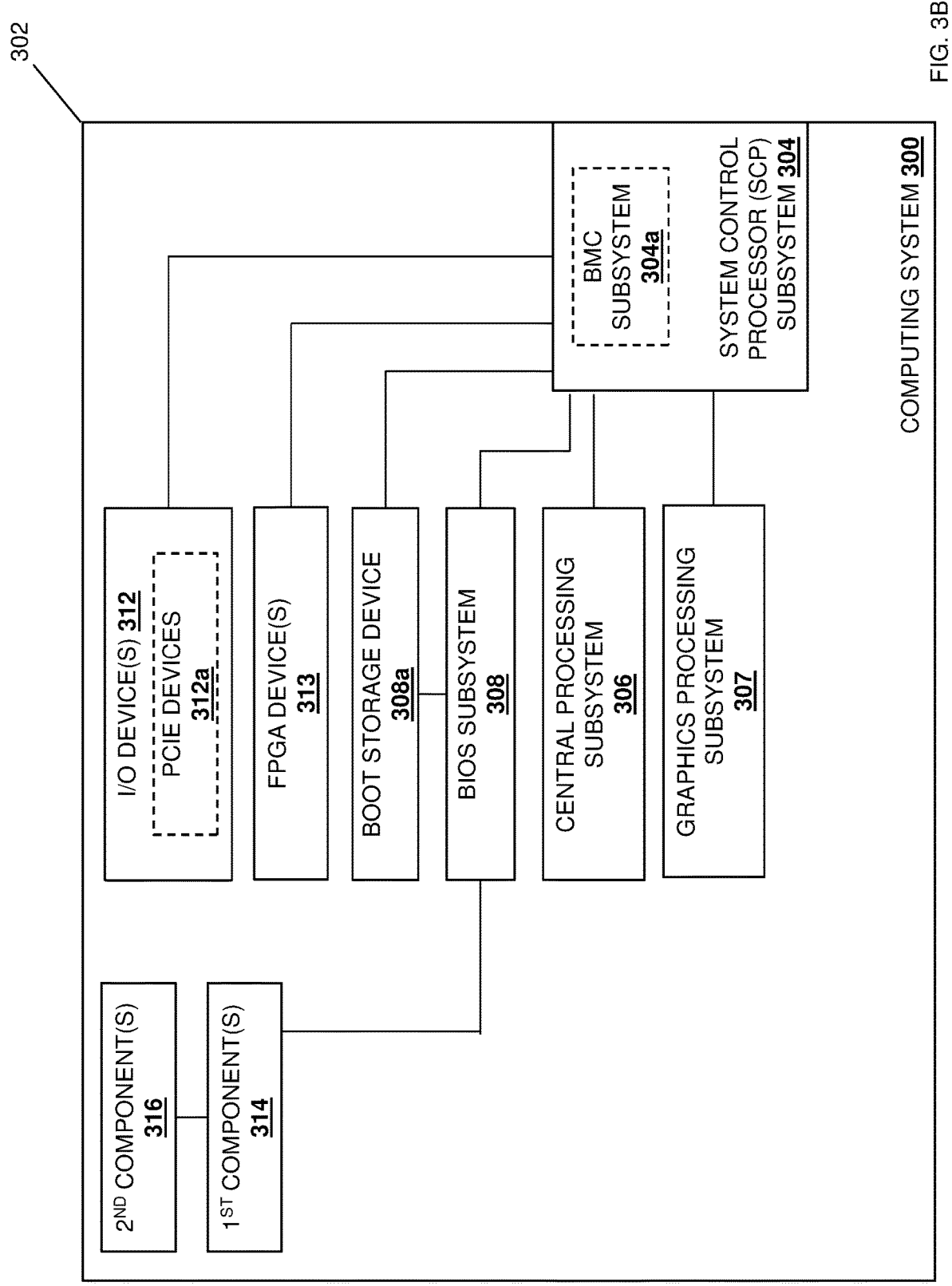
FIG. 3B is a schematic view illustrating an embodiment of a computing system that may be included in the networked system of FIG. 2 and that may utilize the distributed secure communication system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component(s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304*a* that performs the functionality of the BMC subsystem 310 in FIG. 3A.

Figure 4:
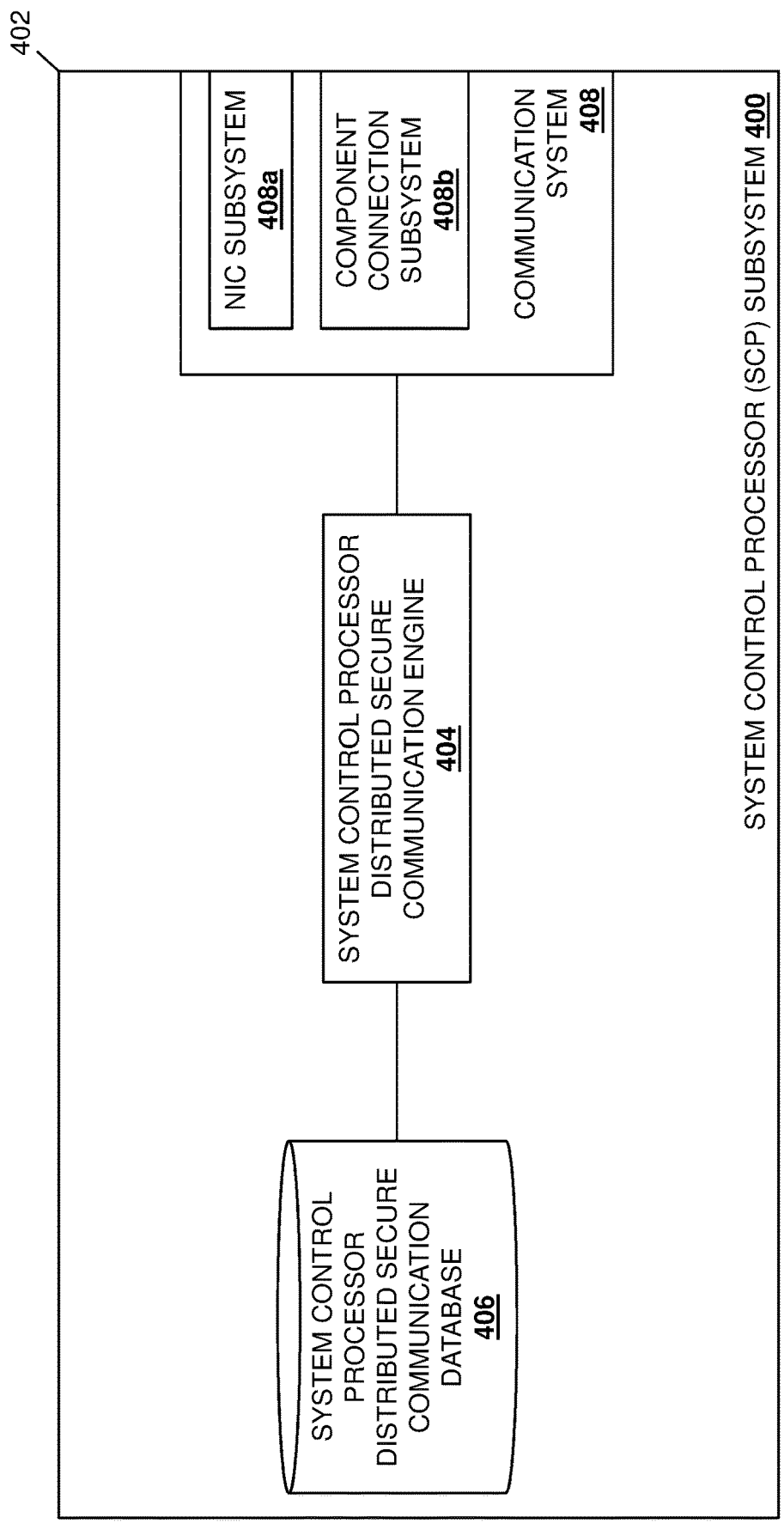
FIG. 4 is a schematic view illustrating an embodiment of an SCP subsystem that may be included in the computing device of FIG. 3A or 3B, and that may provide the distributed secure communication system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP distributed secure communication engine 404 that is configured to perform the functionality of the SCP distributed secure communication engines and/or SCP subsystems discussed below. In a specific example, the SCP processing system providing the SCP distributed secure communication engine 404 may be provided by ARM processor cores in an ARM-based processor, although other processing systems will fall within the scope of the present disclosure as well.

The chassis 302 may also support a storage system (not illustrated, but which may include the storage 108 discussed above with reference to FIG. 1, the SCP memory system discussed above, etc.) that is coupled to the SCP distributed secure communication engine 404 (e.g., via a coupling between the storage system 406 and the SCP processing system), and that may include an SCP distributed secure communication database 406 that may store the private keys, public keys, and/or any of the other information utilized by the SCP distributed secure communication engine 404 as discussed below. As such, one of skill in the art in possession of the present disclosure will appreciate that the storage system that provides the SCP distributed secure communication database 406 may include a variety of secured storage devices and/or secured subsystems known in the art.

The chassis 402 may also support a communication system 408 that is coupled to the SCP distributed secure communication engine 404 (e.g., via a coupling between the communication system 408 and the SCP processing system) and that, in the illustrated embodiment, includes a Network Interface Controller (NIC) subsystem 408*a* (e.g., an Ethernet subsystem) that is configured to connect the SCP subsystem 400 to the network 204 discussed above with reference to FIG. 2, a component connection subsystem 408*b* that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 408 may include any of the connections between the SCP subsystem 400 and the network 204, the central processing subsystem 306, the graphics processing subsystem 307, the BIOS subsystem 308, the boot storage device 308*a*, the BMC subsystem 310, the I/O device(s) 312, the FPGA device(s) 313, and/or any other components utilized with the computing system 202*a*/300. For example, the component connection subsystem 408*b* may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the SCP cloning engine 404 and the CxL Root .mem/.cache subsystem discussed above, etc.) and/or component configurations for providing the functionality discussed below while remaining within the scope of the present disclosure as well.

Figure 5A:
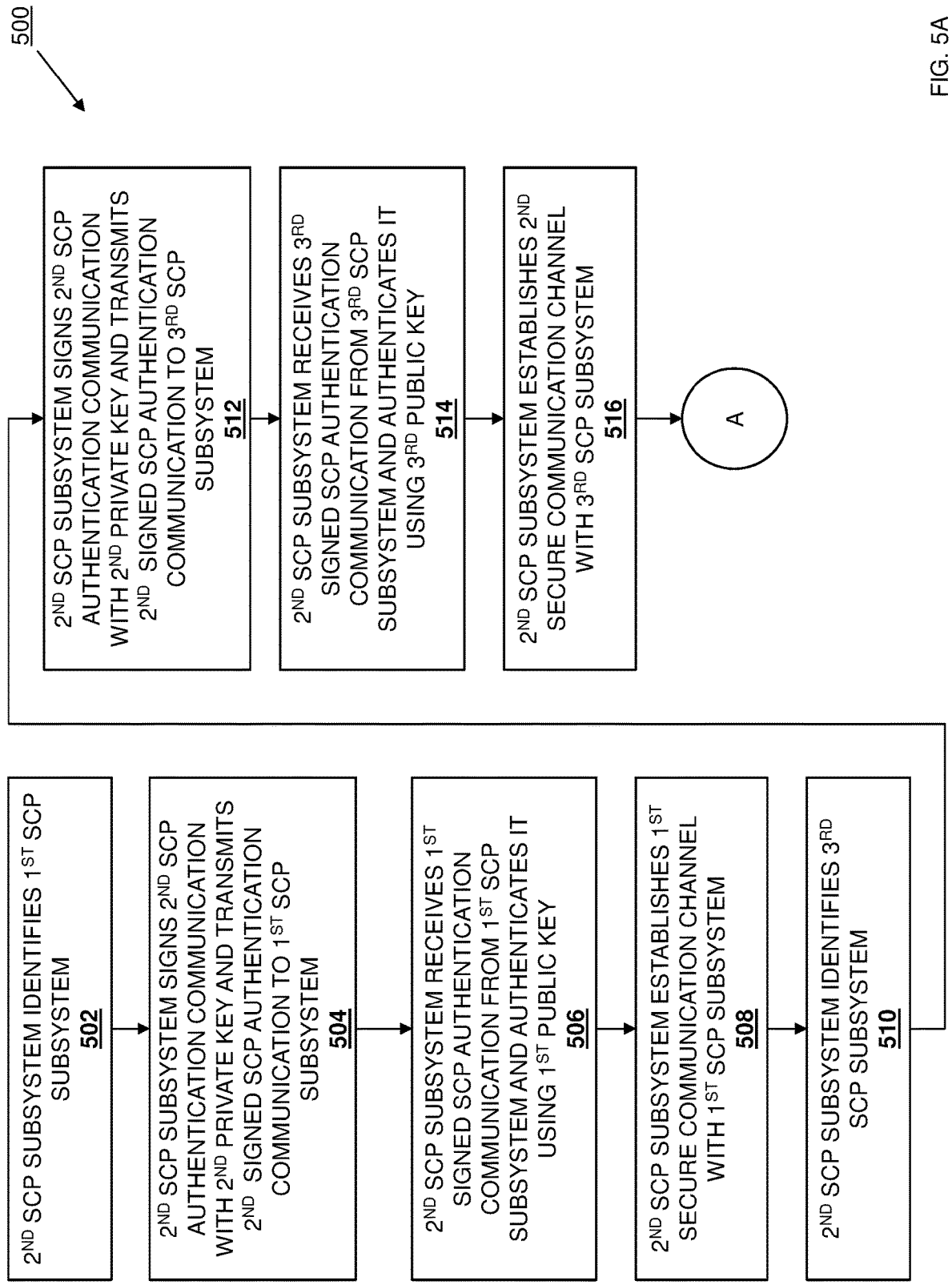
FIG. 5A is a flow chart illustrating an embodiment of a portion of a method for providing distributed secure communications.

Referring now to FIGS. 5A and 5B, an embodiment of a method 500 is illustrated for providing distributed secure communications. As discussed below, the systems and methods of the present disclosure may provide SCP subsystems in computing systems that, subsequent to performing authentication operations to authenticate other SCP subsystems and establishing secure communication channels with those other SCP subsystems, operate to attest to the authentication of each of those other SCP subsystems, which allows those other SCP subsystems to establish secure communication channels with each other without the need to perform authentication operations. For example, the distributed secure communication system of the present disclosure may include a first SCP subsystem coupled to second and third SCP subsystems via a network. The first SCP subsystem identifies the second SCP subsystem, signs a first SCP authentication communication with a first private key to provide a first signed SCP authentication communication that it transmits to the second SCP subsystem. The first SCP subsystem then receives a second signed SCP authentication communication from the second SCP subsystem, authenticates the second signed SCP authentication communication using a second public key associated with the second SCP subsystem and, in response, establishes a first secure communication channel with the second SCP subsystem. The first SCP subsystem then receives an attestation of an authentication of the third SCP subsystem from the second SCP subsystem and, in response, establishes a second secure communication channel with the third SCP subsystem without the transmission of signed SCP authentication communications. Thus, the performance of redundant authentication operations that are conventionally used to establish secure communication channels is reduced, allowing for quicker establishment of a secure communication network relative to conventional secure communications systems.

The method 500 begins at block 502 where a second SCP subsystem identifies a first SCP subsystem. In the specific examples provided below, a second SCP subsystem provided by the SCP subsystem 304 in the computing system 202b/300 performs authentication operations with a first SCP subsystem provided by the SCP subsystem 304 in the computing system 202a/300 in order to authenticate that first SCP subsystem and establish a first secure communication channel with that first SCP subsystem, performs authentication operations with a third SCP subsystem provided by the SCP subsystem 304 in the computing system 202c/300 in order to authenticate that third SCP subsystem and establish a second secure communication channel with that third SCP subsystem, and then attests to the authentication of the third SCP subsystem to the first SCP subsystem, and attests to the authentication of the first SCP subsystem to the third SCP subsystem, which allows the first SCP subsystem and the third SCP subsystem to establish a third secure communication channel with each other without performing authentication operations. However, one of skill in the art in possession of the present disclosure will appreciate that any SCP subsystem may authenticate any other SCP subsystems, or have the authentication of other SCP subsystems attested to them, and then subsequently attest to the authentication of those other SCP subsystems while remaining within the scope of the present disclosure. Furthermore, while SCP subsystems in computing systems 202a/202c are illustrated and described, one of skill in the art in possession of the present disclosure will appreciate that SCP subsystems may be "stand-alone" or otherwise provided outside of any computing system (e.g., outside a server device) while remaining within the scope of the present disclosure as well.

In an embodiment, at or prior to block 502, the SCP distributed secure communication engine 404 in the SCP subsystem 304 of the computing system 202b/300 may be powered on, reset, rebooted, and/or otherwise initialized (e.g., in response to the initialization of the computing system 202b/300) and, in response, may operate to verify, confirm, and/or otherwise authenticate the SCP boot image or other code that it utilizes for initialization operations. For example, the authentication of an SCP boot image by the SCP distributed secure communication engine 404 in the SCP subsystem 304 of the computing system 202b/300 may include generating a hash value from that SCP boot image and checking that hash value against a verified hash value, using a verified public key to verify that the SCP boot image is signed with a corresponding private key, performing other measurements of the SCP boot image to verify its authenticity, and/or performing any other authentication operations that one of skill in the art in possession of the present disclosure would recognize as authenticating the code or other software that will be used to operate the SCP subsystem 304 in the computing system 202b/300. Furthermore, while the SCP subsystem 304 in the computing system 202b/300 is discussed as authenticating the code or other software that it will use to operate, one of skill in the art in possession of the present disclosure will appreciate that the SCP subsystems 304 in the computing systems 202a/300 and/or up to 202c/300 may perform similar authentication operations while remaining within the scope of the present disclosure as well.

In some embodiments, any of the SCP subsystems 304 in the computing systems 202a/300, 202b/300, and up to 202c/300 may be configured to perform the platform root-of-trust functionality described by the inventors of the present disclosure in U.S. patent application Ser. No. 17/027,835, filed on Sep. 22, 2020, the disclosure of which is incorporated herein by reference in its entirety. As such, following the authentication of the code or other software that it will use to operate, any of the SCP subsystems 304 in the computing systems 202a/300, 202b/300, and up to 202c/300 may be configured to authenticate components and/or devices in their respective computing systems, and have those components and/or devices authenticate other components and/or other devices in their respective computing systems. Furthermore, any of the SCP subsystems 304 in the computing systems 202a/300, 202b/300, and up to 202c/300 may be configured to periodically re-authenticate components and/or devices in their respective computing systems, and have those components and/or devices re-authenticate other components and/or other devices in their respective computing systems, as discussed in further detail below.

As will be appreciated by one of skill in the art in possession of the present disclosure, in the event the SCP distributed secure communication engine 404 in the SCP subsystem 304 of any of the computing systems 202a/300, 202b/300, and/or 202c/300 cannot authenticate its SCP boot code image, that SCP subsystem 304 may still complete its initialization operations using that SCP boot code image, but will enter a "non-authenticated"/"unverified"/"untrustworthy" state for possible remediation. As such, while the discussions below assume each of the SCP subsystem 304 in the computing systems 202a/300, 202b/300, and/or 202c/300 are operating using authenticated code, one of skill in the art in possession of the present disclosure will appreciate that in the event an SCP boot image cannot be authenticated by an SCP subsystem, remediation operations (e.g., remote remediation operations performed by the management system 206) may be performed to remediate the "non-authenticated"/"unverified"/"untrustworthy" state of that SCP subsystem in order to allow a secure communications channel to be established with that SCP subsystem. However, in the event the "non-authenticated"/"unverified"/"untrustworthy" state of an SCP subsystem cannot be remediated, the secure communications channels discussed below may not be established with that SCP subsystem.

With reference to FIG. 6A, in an embodiment of block 502, the SCP distributed secure communication engine 404 in the SCP subsystem 304 of the computing system 202b/300 may perform SCP subsystem communication operations 600 that may include identifying the SCP subsystem 304 in the computing system 202a/300. For example, the SCP subsystem communication operations 600 may include the SCP distributed secure communication engine 404 in the SCP subsystem 304 of the computing system 202b/300 generating and broadcasting SCP subsystem discovery communications via the NIC subsystem 408a in its communication system 408 and through the network 204. The SCP distributed secure communication engine 404 in the SCP subsystem 304 of the computing system 202a/300 may then receive those SCP subsystem discovery communications via the network 204 and the NIC subsystem 408a in its communication system 408, and respond by transmitting an SCP subsystem identification communication via the NIC subsystem 408a in its communication system 408 and through the network 204. The SCP distributed secure communication engine 404 in the SCP subsystem 304 of the computing system 202b/300 may then receive that SCP subsystem identification communication via the network 204 and the NIC subsystem 408a in its communication system 408, and identify the SCP subsystem 304 in the computing system 202a/300 at block 502. As will be appreciated by one of skill in the art in possession of the present disclosure, multiple SCP subsystems (e.g., in different computing systems) may respond to the SCP subsystem discovery communications broadcast by the SCP subsystem 304 in the computing system 202b/300, and thus the SCP distributed secure communication engine 404 in the SCP subsystem 304 of the computing system 202b/300 may identify one or more of those SCP subsystems at block 502 by, for example, selecting/identifying one or more of the SCP subsystems that responded to the SCP subsystem discovery communications.

However, while a specific technique for identifying SCP subsystems is illustrated and described herein, one of skill in the art in possession of the present disclosure will recognize that the identification of SCP subsystems at block 502 may be performed using a variety of techniques that will fall within the scope of the present disclosure as well. For examples, any number of "peer" SCP subsystems may be connected via a connection infrastructure (e.g., the networked system 200 in the FIG. 2 being one example) that includes buses, network connections, and/or other couplings, and any two "peer" SCP subsystems may utilize unique peer identifier exchanges (e.g., providing for the exchange of identifiers for the SCP subsystems in the computing systems 202a/300 and 202b/300 with each other) that may be secured based on, for example, a certificate rooted in a Certificate Authority (CA) provided by a manufacturer of those SCP subsystems (or a manufacturer of the computing systems in which they are provided). As such, at block 502, SCP subsystems may monitor a particular channel on the connection infrastructure to listen for the SCP subsystem discovery and/or identification communications discussed above, with that channel reserved for SCP subsystem connection querying for peer SCP subsystems in some embodiments. In some specific examples, peer SCP identification exchanges may include the identification of peer equivalent equipment for use in establishing the secure communication channels described below.

The method 500 then proceeds to block 504 where the second SCP subsystem signs a second SCP authentication communication with a second private key and transmits the second signed SCP authentication communication to the first SCP subsystem. In an embodiment, at block 504 and as part of the SCP subsystem communication operations 600 illustrated in FIG. 6A, the SCP distributed secure communication engine 404 in the SCP subsystem 304 of the computing system 202b/300 may sign a "second" SCP authentication communication using a "second" private key controlled by the SCP subsystem 304 of the computing system 202b/300 to provide a "second" signed SCP authentication communication, and transmit that second signed SCP authentication communication via the NIC subsystem 408a in its communication system 408 and via the network 204 to the SCP subsystem 304 in the computing system 202a/300. For example, the second private key used by the SCP distributed secure communication engine 404 in the SCP subsystem 304 of the computing system 202b/300 to provide the second signed SCP authentication communication at block 504 may be retrieved from the management system 206, the network-attached device(s) 208 (e.g., a network-attached storage system in this example), and/or other locations as discussed in further detail below, and securely stored in its SCP distributed secure communication database 406. Furthermore, the second private key may be associated with a corresponding second public key that is accessible via the management system 206, the network-attached device(s) 208 (e.g., a network-attached storage system in this example), and/or other locations as discussed in further detail below.

As will be appreciated by one of skill in the art in possession of the present disclosure, block 504 may be associated with one or more creation actions in which a unique key pair is created that is rooted in a certificate provided by a Certificate Authority (CA), and that unique key pair may be unique with respect to each SCP subsystem and/or any particular point of SCP subsystem initialization so that it cannot be created by an attacker to gain access to the system via, for example, a key that may have been gathered in a previous boot, reboot, or other initialization cycle. Furthermore, during any key exchange operation between pairs of SCP subsystems, the initial secure communications channel may be created and the key information may be received by each SCP subsystem in the pair and saved in a keystore protected memory region and, as discussed below and for each subsequent SCP subsystem being added to the fabric, the various SCP subsystems may exchange a common key pair over the initial secure channel to allow all of the SCP subsystems in the fabric to use a common key mechanism and simplify the overall communications fabric secure channel. Similarly, as each SCP subsystem is added to the fabric, the key information from the previous SCP subsystems may be distributed to the other members of the fabric to allow for the distributed secure communications channel to be established for the fabric. Further still, in order to protect the private key information in any exchange, only the public key may be exchanged.

As such, at block 504, the SCP distributed secure communication engine 404 in the SCP subsystem 304 of the computing system 202a/300 may receive the second signed SCP authentication communication (transmitted by the SCP subsystem 304 in the computing system 202b/300) via the NIC subsystem 408a in its communication system 408. As discussed in further detail below with reference to the SCP subsystem 304 of the computing system 202b/300, in response to receiving the second signed SCP authentication communication transmitted by the SCP subsystem 304 in the computing system 202b/300, the SCP distributed secure communication engine 404 in the SCP subsystem 304 of the computing system 202a/300 may operate to perform authentication operations that authenticate that second signed SCP authentication communication using a second public key that is associated with the SCP subsystem 304 in the computing system 202b/300 (e.g., a second public key that was retrieved by the SCP distributed secure communication engine 404 in the SCP subsystem 304 of the computing system 202a/300). As also described below, the authentication of the second signed SCP authentication communication by the SCP subsystem 304 in the computing system 202a/300 may allow for the establishment of the first secure communication channel discussed below.

The method 500 then proceeds to block 506 where the second SCP subsystem receives a first signed SCP authentication communication from the first SCP subsystem and authenticates it using a first public key. In an embodiment, at block 506 and as part of the SCP subsystem communication operations 600 illustrated in FIG. 6A, the SCP distributed secure communication engine 404 in the SCP subsystem 304 of the computing system 202a/300 may sign a "first" SCP authentication communication using a "first" private key controlled by the SCP subsystem 304 of the computing system 202a/300 to provide a "first" signed SCP authentication communication, and transmit that first signed SCP authentication communication via the NIC subsystem 408a in its communication system 408 and via the network 204 to the SCP subsystem 304 in the computing system 202b/300. For example, the first private key used by the SCP distributed secure communication engine 404 in the SCP subsystem 304 of the computing system 202a/300 to provide the first signed SCP authentication communication at block 504 may be retrieved from the management system 206, the network-attached device(s) 208 (e.g., a network-attached storage system in this example), and/or other locations, and securely stored in its SCP distributed secure communication database 406. Furthermore, the first private key may be associated with a corresponding first public key that is accessible via the management system 206, the network-attached device(s) 208 (e.g., a network-attached storage system in this example), and/or other locations. As such, in some embodiments, public/private key pairs utilized by the SCP subsystems during the method 500 may be securely stored and accessed via the network 204.

As such, at block 506, the SCP distributed secure communication engine 404 in the SCP subsystem 304 of the computing system 202b/300 may receive the first signed SCP authentication communication (transmitted by the SCP subsystem 304 in the computing system 202a/300) via the NIC subsystem 408a in its communication system 408. In response to receiving the first signed SCP authentication communication transmitted by the SCP subsystem 304 in the computing system 202a/300, the SCP distributed secure communication engine 404 in the SCP subsystem 304 of the computing system 202b/300 may operate to perform a variety of public/private key authentication operations that authenticate that first signed SCP authentication communication using a first public key that is associated with the SCP subsystem 304 in the computing system 202a/300.

In some embodiments, during or prior to block 506, the SCP distributed secure communication engine 404 in the SCP subsystem 304 of the computing system 202b/300 may retrieve the first public key via the network 204 from the management system 206, the network-attached device(s) 208 (e.g., a network-attached storage system in this example), and/or other locations, and use that first public key to authenticate the first signed SCP authentication communication at block 506. As such, the first public key used to authenticate the first signed SCP authentication communication may be retrieved in response to receiving the first signed SCP authentication communication. However, one of skill in the art in possession of the present disclosure will recognize that the first public key may have been previously been stored in the SCP secured communication database 406 in the SCP subsystem 400 in the computing system 202b/300, and may be retrieved from that secure storage in response to receiving the first signed SCP authentication communication while remaining within the scope of the present disclosure as well.

The method 500 then proceeds to block 508 where the second SCP subsystem establishes a first secure communication channel with the first SCP subsystem. With reference to FIG. 6B, in an embodiment of block 508 and in response to authenticating the first signed SCP authentication communication received from the SCP subsystem 304 in the computing system 202a/300 (and along with the SCP subsystem 304 in the computing system 202a/300 authenticating the second signed SCP authentication communication received from the SCP subsystem 304 in the computing system 202b/300), the SCP distributed secure communication engine 404 in the SCP subsystem 304 of the computing system 202b/300 may establish a secure communication channel 602 with the SCP subsystem 304 in the computing system 202a/300. As will be appreciated by one of skill in the art in possession of the present disclosure, the authentication of the first signed SCP authentication communication received from the SCP subsystem 304 in the computing system 202a/300 may be considered a "trust verification" operation by the SCP subsystem 304 in the computing system 202b/300 that, along with the authentication of the second signed SCP authentication communication by the SCP subsystem 304 in the computing system 202a/300, discussed above), allows the SCP subsystem 304 in the computing system 202b/300 and the SCP subsystem 304 in the computing system 202a/300 to trust each other such that they may exchange secure communications.

In an embodiment, the SCP subsystem 304 in the computing system 202b/300 and the SCP subsystem 304 in the computing system 202a/300 may subsequently communication via the secure communication channel 602 via enabling keys exchanged using the distributed key management functionality described by the inventors of the present disclosure in U.S. patent application Ser. No. 17/071,268, filed on Oct. 15, 2020, the disclosure of which is incorporated herein by reference in its entirety. In a specific example, the use of the secure communication channel 602 may be performed via Public Key Infrastructure (PKI) key techniques, and may provide for the exchange of secure, encrypted communications between the SCP subsystem 304 in the computing system 202b/300 and the SCP subsystem 304 in the computing system 202a/300. As will be appreciated by one of skill in the art in possession of the present disclosure, following the establishment of the secure communication channel 602, the SCP subsystem 304 in the computing system 202b/300 and the SCP subsystem 304 in the computing system 202a/300 may exchange a variety of data in a secure manner via the secure communication channel 602. For example, in some embodiments, the SCP subsystem 304 in the computing system 202b/300 and the SCP subsystem 304 in the computing system 202a/300 may exchange control and/or management communications via the secure communication channel 602, while exchanging other data communications (e.g., non-control/non-management data) via some other relatively unsecured communication channel that is provided between the SCP subsystem 304 in the computing system 202b/300 and the SCP subsystem 304 in the computing system 202a/300. As such, an SCP control plane fabric may be provided that is segregated from an SCP data plane fabric, and in some examples data and management control operations may be segregated within that SCP control plane fabric as well. However, in other embodiments, the SCP subsystem 304 in the computing system 202b/300 and the SCP subsystem 304 in the computing system 202a/300 may exchange all data communications via the secure communication channel 602 while remaining within the scope of the present disclosure as well.

The method 500 then proceeds to block 510 where the second SCP subsystem identifies a third SCP subsystem. With reference to FIG. 6C, in an embodiment of block 510, the SCP distributed secure communication engine 404 in the SCP subsystem 304 of the computing system 202b/300 may perform SCP subsystem communication operations 604 that operate to identify the SCP subsystem 304 in the computing system 202c/300. Similarly as discussed above, the SCP subsystem communication operations 604 may include the SCP distributed secure communication engine 404 in the SCP subsystem 304 of the computing system 202b/300 generating and broadcasting SCP subsystem discovery communications via the NIC subsystem 408a in its communication system 408 and through the network 204. The SCP distributed secure communication engine 404 in the SCP subsystem 304 of the computing system 202c/300 may then receive those SCP subsystem discovery communications via the network 204 and the NIC subsystem 408a in its communication system 408, and respond by transmitting an SCP subsystem identification communication via the NIC subsystem 408a in its communication system 408 and through the network 204. The SCP distributed secure communication engine 404 in the SCP subsystem 304 of the computing system 202b/300 may then receive that SCP subsystem identification communication via the network 204 and the NIC subsystem 408a in its communication system 408, and identify the SCP subsystem 304 in the computing system 202c/300 at block 502. As discussed above, multiple SCP subsystems (e.g., in different computing systems) may respond to the SCP subsystem discovery communications broadcast by the SCP subsystem 304 in the computing system 202b/300, and thus the SCP distributed secure communication engine 404 in the SCP subsystem 304 of the computing system 202b/300 may identify the SCP subsystem 304 in the computing system 202c/300 at block 510 at the same time as identifying the SCP subsystem 304 in the computing system 202a/300 at block 502, or at a different time than identifying the SCP subsystem 304 in the computing system 202a/300 at block 502.

The method 500 then proceeds to block 512 where the second SCP subsystem signs a second SCP authentication communication with the second private key and transmits the second signed SCP authentication communication to the third SCP subsystem. In an embodiment, at block 512 and as part of the SCP subsystem communication operations 604 illustrated in FIG. 6C, the SCP distributed secure communication engine 404 in the SCP subsystem 304 of the computing system 202b/300 may sign a "second" SCP authentication communication using a "second" private key controlled by the SCP subsystem 304 of the computing system 202b/300 to provide a "second" signed SCP authentication communication, and transmit that second signed SCP authentication communication via the NIC subsystem 408a in its communication system 408 and through the network 204 to the SCP subsystem 304 in the computing system 202c/300. As discussed above, the second private key used by the SCP distributed secure communication engine 404 in the SCP subsystem 304 of the computing system 202b/300 to provide the second signed SCP authentication communication at block 512 may be retrieved from the management system 206, the network-attached device(s) 208 (e.g., a network-attached storage system in this example), and/or other locations, and may be securely stored in its SCP distributed secure communication database 406. Furthermore, the second private key may be associated with a corresponding second public key that is accessible via the management system 206, the network-attached device(s) 208 (e.g., a network-attached storage system in this example), and/or other location as discussed in further detail below.

As such, at block 512, the SCP distributed secure communication engine 404 in the SCP subsystem 304 of the computing system 202c/300 may receive the second signed SCP authentication communication transmitted by the SCP subsystem 304 in the computing system 202b/300 via the NIC subsystem 408a in its communication system 408. As discussed in further detail below with reference to the SCP subsystem 304 of the computing system 202b/300, in response to receiving the second signed SCP authentication communication transmitted by the SCP subsystem 304 in the computing system 202b/300, the SCP distributed secure communication engine 404 in the SCP subsystem 304 of the computing system 202c/300 may operate to perform authentication operations that authenticate that second signed SCP authentication communication (e.g., using the second public key that is associated with the SCP subsystem 304 in the computing system 202b/300, and that may have been retrieved by the SCP distributed secure communication engine 404 in the SCP subsystem 304 of the computing system 202c/300). As also described below, the authentication of the second signed SCP authentication communication by the SCP subsystem 304 in the computing system 202c/300 may allow for the establishment of the second secure communication channel discussed below.

The method 500 then proceeds to block 514 where the second SCP subsystem receives a third signed SCP authentication communication from the third SCP subsystem and authenticates it using a third public key. In an embodiment, at block 514 and as part of the SCP subsystem communication operations 604 illustrated in FIG. 6C, the SCP distributed secure communication engine 404 in the SCP subsystem 304 of the computing system 202c/300 may sign a "third" SCP authentication communication using a "third" private key controlled by the SCP subsystem 304 of the computing system 202c/300 to provide a "third" signed SCP authentication communication, and transmit that third signed SCP authentication communication via the NIC subsystem 408a in its communication system 408 and through the network 204 to the SCP subsystem 304 in the computing system 202b/300. For example, the third private key used by the SCP distributed secure communication engine 404 in the SCP subsystem 304 of the computing system 202c/300 to provide the third signed SCP authentication communication at block 514 may be retrieved from the management system 206, the network-attached device(s) 208 (e.g., a network-attached storage system in this example), and/or other locations, and securely stored in its SCP distributed secure communication database 406. Furthermore, the third private key may be associated with a corresponding third public key that is accessible via the management system 206, the network-attached device(s) 208 (e.g., a network-attached storage system in this example), and/or other locations. As such, in some embodiments, public/private key pairs utilized by the SCP subsystems during the method 500 may be securely stored and accessed via the network 204.

Thus, at block 514, the SCP distributed secure communication engine 404 in the SCP subsystem 304 of the computing system 202b/300 may receive the third signed SCP authentication communication transmitted by the SCP subsystem 304 in the computing system 202c/300 via the NIC subsystem 408a in its communication system 408. In response to receiving the third signed SCP authentication communication transmitted by the SCP subsystem 304 in the computing system 202c/300, the SCP distributed secure communication engine 404 in the SCP subsystem 304 of the computing system 202b/300 may operate to perform a variety of public/private key authentication operations that authenticate that third signed SCP authentication communication using a third public key that is associated with the SCP subsystem 304 in the computing system 202c/300.

In some embodiments, during or prior to block 514, the SCP distributed secure communication engine 404 in the SCP subsystem 304 of the computing system 202b/300 may retrieve the third public key via the network 204 from the management system 206, the network-attached device(s) 208 (e.g., a network-attached storage system in this example), and/or other locations, and use that third public key to authenticate the third signed SCP authentication communication. As such, the third public key used to authenticate the third signed SCP authentication communication may be retrieved in response to receiving the third signed SCP authentication communication. However, one of skill in the art in possession of the present disclosure will recognize that the third public key may have been previously been stored in the SCP secured communication database 406 in the SCP subsystem 400 in the computing system 202b/300, and may be retrieved from that secure storage in response to receiving the third signed SCP authentication communication while remaining within the scope of the present disclosure as well.

The method 500 then proceeds to block 516 where the second SCP subsystem establishes a second secure communication channel with the third SCP subsystem. With reference to FIG. 6D, in an embodiment of block 516 and in response to authenticating the third signed SCP authentication communication received from the SCP subsystem 304 in the computing system 202c/300 (and along with the SCP subsystem 304 in the computing system 202c/300 authenticating the second signed SCP authentication communication received from the SCP subsystem 304 in the computing system 202b/300), the SCP distributed secure communication engine 404 in the SCP subsystem 304 of the computing system 202b/300 may establish a secure communication channel 605 with the SCP subsystem 304 in the computing system 202c/300. As will be appreciated by one of skill in the art in possession of the present disclosure, the authentication of the third signed SCP authentication communication received from the SCP subsystem 304 in the computing system 202c/300 may be considered a "trust verification" operation by the SCP subsystem 304 in the computing system 202b/300 that, along with the authentication of the second signed SCP authentication communication by the SCP subsystem 304 in the computing system 202c/300) allows the SCP subsystem 304 in the computing system 202b/300 and the SCP subsystem 304 in the computing system 202c/300 to trust each other such that they may exchange secure communications.

Similarly as described above, the SCP subsystem 304 in the computing system 202b/300 and the SCP subsystem 304 in the computing system 202c/300 may subsequently communication via the secure communication channel 605 via enabling keys exchanged using the distributed key management functionality described by the inventors of the present disclosure in U.S. patent application Ser. No. 17/071,268, filed on Oct. 15, 2020, the disclosure of which is incorporated herein by reference in its entirety. As such, the use of the secure communication channel 605 may be performed using Public Key Infrastructure (PKI) key techniques, and may provide for the exchange of secure, encrypted communications between the SCP subsystem 304 in the computing system 202b/300 and the SCP subsystem 304 in the computing system 202c/300. As will be appreciated by one of skill in the art in possession of the present disclosure, following the establishment of the secure communication channel 605, the SCP subsystem 304 in the computing system 202b/300 and the SCP subsystem 304 in the computing system 202c/300 may exchange a variety of data in a secure manner via the secure communication channel 605. For example, in some embodiments, the SCP subsystem 304 in the computing system 202b/300 and the SCP subsystem 304 in the computing system 202c/300 may exchange control and/or management communications via the secure communication channel 605, while exchanging other data communications (e.g., non-control/non-management data) via some other relatively unsecured communication channel that is provided between the SCP subsystem 304 in the computing system 202b/300 and the SCP subsystem 304 in the computing system 202c/300. As such, an SCP control plane fabric may be provided that is segregated from an SCP data plane fabric, and in some examples data and management control operations may be segregated within that SCP control plane fabric as well. However, in other embodiments, the SCP subsystem 304 in the computing system 202b/300 and the SCP subsystem 304 in the computing system 202c/300 may exchange all data communications via the secure communication channel 605 while remaining within the scope of the present disclosure as well.

The method 500 then proceeds to block 518 where the second SCP subsystem attests to an authentication of the third SCP subsystem to the first SCP subsystem. With reference to FIG. 6E, in an embodiment of block 518, the SCP distributed secure communication engine 404 in the SCP subsystem 304 of the computing system 202b/300 may perform SCP attestation operations 606 that may include generating and transmitting SCP attestation communications via the NIC subsystem 408a in its communication system 408 and through the network 204 to the computing system 202a/300 using the secure communication channel 602. In a specific example, the SCP attestation communications transmitted by the SCP subsystem 304 in the computing system 202b/300 at block 518 may include the third public key associated with the SCP subsystem 304 in the computing system 202c/300, SCP subsystem communication connection information that identifies a communication connection to the SCP subsystem 304 in the computing system 202c/300, and/or any other information that one of skill in the art in possession of the present disclosure would recognize as providing for the functionality discussed below. However, while specific SCP attestation communication information is described, one of skill in the art in possession of the present disclosure will appreciate that a variety of information may be utilized to identify the SCP subsystem 304 in the computing system 202c/300 to the SCP subsystem 304 in the computing system 202a/300 and attest to its authentication while remaining within the scope of the present disclosure as well.

In some embodiments, any time after peer SCP subsystem communications are established, a common fabric key pair may be created to simplify the number of keys that are required between endpoints (e.g., SCP subsystems). As will be appreciated by one of skill in the art in possession of the present disclosure, the use of a common fabric key pair simplifies the delivery of the secured information between the SCP systems in the fabric by allowing the single key to protect the data transmitted, and allowing a common communications method (e.g., a multicast channel in the IP domain) to be utilized for the delivery of the information to multiple SCP subsystems in the fabric. As the SCP subsystems scale to larger numbers, such operations optimize the efficiency of the information delivery over the single channel (e.g., relative to the use of a direct link to each SCP in the fabric). In some embodiments, the common key pair may be created after the first two SCP subsystems established a secure communications channel. For example, the common key may be created by one of the SCP subsystems in the pair, and that common key any then be encrypted and delivered to the other SCP subsystem in that pair in the "initial" fabric. Communications may then be verified between the two SCP subsystems using that common key, and when the third SCP subsystem joins the fabric using a direct peer-to-peer established secure communications link, the common key pair may be encrypted and delivered to the third SCP subsystem in the fabric in order to allow for the common key to be used for the secure communications. As will be appreciated by one of skill in the art in possession of the present disclosure, this operation may then be repeated for each subsequent SCP subsystem that joins the fabric.

As such, at block 518, the SCP distributed secure communication engine 404 in the SCP subsystem 304 of the computing system 202a/300 may receive, as part of the SCP attestation operations 606, the SCP attestation communications transmitted on the secure communication channel 602 via the network 204 and the NIC subsystem 408a in its communication system 408. As will be appreciated by one of skill in the art in possession of the present disclosure, the receiving of the SCP attestation communications via the secure communication channel 602 allows those SCP attestation communications to be trusted (i.e., based on the authentication/trust verification operations performed above to establish the secure communication channel 602), and thus the identification of the SCP subsystem 304 in the computing system 202c/300 in SCP attestation communications may operate, by itself, to attest to the authentication of the SCP subsystem 304 in the computing system 202c/300. However, one of skill in the art in possession of the present disclosure will appreciate that other information may be provided to the SCP subsystem 304 in the computing system 202a/300 to attest to the authentication of the SCP subsystem 304 in the computing system 202c/300 while remaining within the scope of the present disclosure as well.

The method 500 then proceeds to block 520 where the second SCP subsystem attests to an authentication of the first SCP subsystem to the third SCP subsystem. With reference to FIG. 6F, in an embodiment of block 520, the SCP distributed secure communication engine 404 in the SCP subsystem 304 of the computing system 202b/300 may perform SCP attestation operations 608 that may include generating and transmitting SCP attestation communications via the NIC subsystem 408a in its communication system 408 and through the network 204 to the computing system 202c/300 using the secure communication channel 605. In a specific example, the SCP attestation communications transmitted by the SCP subsystem 304 in the computing system 202b/300 at block 520 may include the first public key associated with the SCP subsystem 304 in the computing system 202a/300, SCP subsystem communication connection information that identifies a communication connection to the SCP subsystem 304 in the computing system 202a/300, and/or any other information that one of skill in the art in possession of the present disclosure would recognize as providing for the functionality discussed below. However, while specific SCP attestation communication information is described, one of skill in the art in possession of the present disclosure will appreciate that a variety of information may be utilized to identify the SCP subsystem 304 in the computing system 202a/300 to the SCP subsystem 304 in the computing system 202c/300 and attest to its authentication while remaining within the scope of the present disclosure as well.

As such, at block 520, the SCP distributed secure communication engine 404 in the SCP subsystem 304 of the computing system 202c/300 may receive, as part of the SCP attestation operations 608, the SCP attestation communications transmitted on the secure communication channel 605 via the network 204 and the NIC subsystem 408a in its communication system 408. As will be appreciated by one of skill in the art in possession of the present disclosure, the receiving of the SCP attestation communications via the secure communication channel 605 allows those SCP attestation communications to be trusted (i.e., based on the authentication/trust verification operations performed above to establish the secure communication channel 605), and thus the identification of the SCP subsystem 304 in the computing system 202a/300 in SCP attestation communications may operate, by itself, to attest to the authentication of the SCP subsystem 304 in the computing system 202a/300. However, one of skill in the art in possession of the present disclosure will appreciate that other information may be provided to the SCP subsystem 304 in the computing system 202c/300 to attest to the authentication of the SCP subsystem 304 in the computing system 202a/300 while remaining within the scope of the present disclosure as well.

The method 500 then proceeds to block 522 where the first SCP subsystem and the third SCP subsystem establish a third secure communication channel without transmitting signed SCP authentication communications. With reference to FIG. 6G, in an embodiment of block 522 and in response to attestation of the authentication of the SCP subsystem 304 in the computing system 202c/300 to the SCP subsystem 304 in the computing system 202a/300, and the attestation of the authentication of the SCP subsystem 304 in the computing system 202a/300 to the SCP subsystem 304 in the computing system 202c/300, the SCP distributed secure communication engine 404 in the SCP subsystems 304 in each of the computing systems 202a/300 and 202c/300 may establish a secure communication channel 610 between each other. As will be appreciated by one of skill in the art in possession of the present disclosure, the attestation of the authentication of each of the SCP subsystems 304 in the computing systems 202c/300 and 202a/300 to each other operates as a "trust verification" operation that allows the SCP subsystems 304 in the computing systems 202a/300 and 202b/300 to trust each other such that secure communications may be exchanged between those SCP subsystems without the need to perform authentication operations (e.g., like those that were performed during blocks 506 and 514 discussed above).

Similarly as discussed above, the SCP subsystem 304 in the computing system 202a/300 and the SCP subsystem 304 in the computing system 202c/300 may subsequently communication via the secure communication channel 610 via enabling keys exchanged using the distributed key management functionality described by the inventors of the present disclosure in U.S. patent application Ser. No. 17/071,268, filed on Oct. 15, 2020f, the disclosure of which is incorporated herein by reference in its entirety. As such, the secure communication channel 610 may provide for the exchange of secure, encrypted communications between the SCP subsystem 304 in the computing system 202a/300 and the SCP subsystem 304 in the computing system 202c/300. As will be appreciated by one of skill in the art in possession of the present disclosure, following the establishment of the secure communication channel 610, the SCP subsystem 304 in the computing system 202a/300 and the SCP subsystem 304 in the computing system 202c/300 may exchange a variety of data in a secure manner via the secure communication channel 610. For example, in some embodiments, the SCP subsystem 304 in the computing system 202a/300 and the SCP subsystem 304 in the computing system 202c/300 may exchange control and/or management communications via the secure communication channel 610, while exchanging other data communications (e.g., non-control/non-management data) via some other relatively unsecured communication channel that is provided between the SCP subsystem 304 in the computing system 202a/300 and the SCP subsystem 304 in the computing system 202c/300. As such, an SCP control plane fabric may be provided that is segregated from an SCP data plane fabric, and in some examples data and management control operations may be segregated within that SCP control plane fabric as well. However, in other embodiments, the SCP subsystem 304 in the computing system 202a/300 and the SCP subsystem 304 in the computing system 202c/300 may exchange all data communications via the secure communication channel 610 while remaining within the scope of the present disclosure as well.

The method 500 then proceeds to block 524 where the first, second, and third SCP subsystems transmit communications via the first, second, and third secure communication channels. In an embodiment, at block 524 and as discussed above, the SCP subsystem 304 in the computing system 202a/300 and the SCP subsystem 304 in the computing system 202b/300 may exchange a variety of data in a secure manner via the secure communication channel 602, the SCP subsystem 304 in the computing system 202b/300 and the SCP subsystem 304 in the computing system 202c/300 may exchange a variety of data in a secure manner via the secure communication channel 605, and the SCP subsystem 304 in the computing system 202c/300 and the SCP subsystem 304 in the computing system 202a/300 may exchange a variety of data in a secure manner via the secure communication channel 610.

As will be appreciated by one of skill in the art in possession of the present disclosure, any SCP subsystem subsequently added to the networked subsystem 200 may be authenticated by one of the SCP subsystems 304 in the computing systems 202a/300, 202b/300, or 202c/300 in order to establish a secure communication channel, and then have the authentication of the other SCP subsystems attested to it to that secure communications channels may be established with any of those SCP subsystems as well. As such, additional SCP subsystems may be quickly and easily added to the secure communication "fabric" to grow that secure communication fabric. Thus, the SCP subsystems 304 in the computing systems 202a-202c/300 can coordinate with each other by creating a secure SCP infrastructure traffic plane, which (in effect) creates a virtual switching fabric, establishes infrastructure control plane data exchanges (e.g., operations and telemetry) between peer SCP subsystems, and eliminates duplicative SCP operations on peer SCP subsystems.

In some embodiments, the SCP subsystems providing the secure communication fabric may operate to perform the platform root-of-trust functionality described by the inventors of the present disclosure in U.S. patent application Ser. No. 17/027,835, filed on Sep. 22, 2020, the disclosure of which is incorporated herein by reference in its entirety. As such, the SCP subsystems may operate to periodically check whether any SCP subsystem (or its computing system) has changed and, if so, remove that SCP subsystem from the secure communication fabric (e.g., by closing the secure communication channel established with that SCP subsystem). Furthermore, any SCP subsystem removed from the secure communication fabric may be prevented from accessing the public/private key pairs utilized to establish the secure communication channels as described above, but may be allowed to again access those public/private key pairs once they can again be verified or otherwise authenticated.

Thus, systems and methods have been described that provide SCP subsystems in server devices that, subsequent to performing authentication operations to authenticate other SCP subsystems and establishing secure communication channels with those other SCP subsystems, operate to attest to the authentication of each of those other SCP subsystems, which allows those other SCP subsystems to establish secure communication channels with each other without the need to perform authentication operations. For example, the distributed secure communication system of the present disclosure may include a first SCP subsystem coupled to second and third SCP subsystems via a network. The first SCP subsystem identifies the second SCP subsystem, signs a first SCP authentication communication with a first private key to provide a first signed SCP authentication communication that it transmits to the second SCP subsystem. The first SCP subsystem then receives a second signed SCP authentication communication from the second SCP subsystem, authenticates the second signed SCP authentication communication using a second public key associated with the second SCP subsystem and, in response, establishes a first secure communication channel with the second SCP subsystem. The first SCP subsystem then receives an attestation of an authentication of the third SCP subsystem from the second SCP subsystem and, in response, establishes a second secure communication channel with the third SCP subsystem without the transmission of signed SCP authentication communications. Thus, the performance of redundant authentication operations that are conventionally used to establish secure communication channels is reduced, allowing for quicker establishment of a secure communication network relative to conventional secure communications systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A distributed secure communication system, comprising:
    a third System Control Processor (SCP) subsystem;
    a second SCP subsystem that is coupled to the third SCP subsystem via a network; and
    a first SCP subsystem that is coupled to the second SCP subsystem and the third SCP subsystem via the network, wherein the first SCP subsystem is configured to:
        identify the second SCP subsystem and, in response, perform a signed communication secure communication channel establishment procedure with the second SCP subsystem that includes:
            signing a first SCP authentication communication with a first private key to provide a first signed SCP authentication communication;
            transmitting the first signed SCP authentication communication to the second SCP subsystem;
            receiving a second signed SCP authentication communication from the second SCP subsystem and, in response, authenticating the second signed SCP authentication communication using a second public key associated with the second SCP subsystem; and establishing, in response to authenticating the second signed SCP authentication communication, a first secure communication channel with the second SCP subsystem; and receive, from the second SCP subsystem via the first secure communication channel, an attestation of an authentication of the third SCP subsystem that established a second secure communication channel between the SCP subsystem and the third SCP subsystem and, in response, establish a third secure communication channel with the third SCP subsystem without performing the signed communication secure communication channel establishment procedure with the third SCP subsystem.

2. The system of claim 1, wherein the first SCP subsystem is configured to:
monitor for SCP subsystems and, in response, identify the second SCP subsystem.

3. The system of claim 1, wherein the first SCP subsystem is configured to:
retrieve, via a network, the second public key associated with the second SCP subsystem.

4. The system of claim 1, wherein the first SCP subsystem is configured to:
transmit, via the first secure communication channel, first control communications with the second SCP subsystem; and
transmit, via the third secure communication channel, second control communications with the third SCP subsystem.

5. The system of claim 4, wherein the first SCP subsystem is configured to:
transmit, via a first unsecured communication channel, first data communications with the second SCP subsystem; and
transmit, via a second unsecured communication channel, second data communications with the third SCP subsystem.

6. The system of claim 1, wherein the attestation of the authentication of the third SCP subsystem includes:
a third public key associated with the third SCP subsystem; and
third SCP subsystem communication connection information.

7. An Information Handling System (IHS), comprising:
a processing system; and
a memory system that is coupled to the processing system and that includes instructions that, when executed by the processing system, cause the processing system to provide a distributed secure communication engine that is configured to:
identify a second System Control Processor (SCP) subsystem and, in response, perform a signed communication secure communication channel establishment procedure with the second SCP subsystem that includes:
signing a first SCP authentication communication with a first private key to provide a first signed SCP authentication communication;
transmitting the first signed SCP authentication communication to the second SCP subsystem;
receiving a second signed SCP authentication communication from the second SCP subsystem and, in response, authenticating the second signed SCP authentication communication using a second public key associated with the second SCP subsystem; and establishing, in response to authenticating the second signed SCP authentication communication, a first secure communication channel with the second SCP subsystem; and receive, from the second SCP subsystem via the first secure communication channel, an attestation of an authentication of a third SCP subsystem that established a second secure communication channel between the second SCP subsystem and the third SCP subsystem and, in response, establish a third secure communication channel with the third SCP subsystem without performing the signed communication secure communication channel establishment procedure with the third SCP subsystem.

8. The IHS of claim 7, wherein the distributed secure communication engine is configured to:
monitor for SCP subsystems and, in response, identify the second SCP subsystem.

9. The IHS of claim 7, wherein the distributed secure communication engine is configured to:
retrieve, via a network, the second public key associated with the second SCP subsystem.

10. The IHS of claim 7, wherein the distributed secure communication engine is configured to:
transmit, via the first secure communication channel, first control communications with the second SCP subsystem; and
transmit, via the third secure communication channel, second control communications with the third SCP subsystem.

11. The IHS of claim 10, wherein the distributed secure communication engine is configured to:
transmit, via a first unsecured communication channel, first data communications with the second SCP subsystem; and
transmit, via a second unsecured communication channel, second data communications with the third SCP subsystem.

12. The IHS of claim 7, wherein the attestation of the authentication of the third SCP subsystem includes:
a third public key associated with the third SCP subsystem; and
third SCP subsystem communication connection information.

13. The IHS of claim 7, wherein the distributed secure communication engine is configured to:
receive, from the third SCP subsystem via the second secure communication channel, an attestation of an authentication of a fourth SCP subsystem that established a fourth secure communication channel between the third SCP subsystem and the fourth SCP subsystem and, in response, establish a fifth secure communication channel with the fourth SCP subsystem without performing the signed communication secure communication channel establishment procedure with the fourth SCP subsystem.

14. A method for providing distributed secure communications, comprising:
identifying, by a first System Control Processor (SCP) subsystem, a second SCP subsystem and, in response, performing a signed communication secure communication channel establishment procedure with the second SCP subsystem that includes:
signing a first SCP authentication communication with a first private key to provide a first signed SCP authentication communication;

transmitting, by the first SCP subsystem, the first signed SCP authentication communication to the second SCP subsystem;

receiving, by the first SCP subsystem, a second signed SCP authentication communication from the second SCP subsystem and, in response, authenticating the second signed SCP authentication communication using a second public key associated with the second SCP subsystem; and establishing, by the first SCP subsystem in response to authenticating the second signed SCP authentication communication, a first secure communication channel with the second SCP subsystem; and receiving, by the first SCP subsystem from the second SCP subsystem via the first secure communication channel, an attestation of an authentication of a third SCP subsystem that established a second secure communication channel between the second SCP subsystem and the third SCP subsystem and, in response, establishing a third secure communication channel with the third SCP subsystem without performing the signed communication secure communication channel establishment procedure with the third SCP subsystem.

15. The method of claim 14, further comprising:
monitoring, by the first SCP subsystem, for SCP subsystems and, in response, identifying the second SCP subsystem.

16. The method of claim 14, further comprising:
retrieving, by the first SCP subsystem via a network, the second public key associated with the second SCP subsystem.

17. The method of claim 14, further comprising:
transmitting, by the first SCP subsystem via the first secure communication channel, first control communications with the second SCP subsystem; and
transmitting, by the first SCP subsystem via the second secure communication channel, second control communications with the third SCP subsystem.

18. The method of claim 17, further comprising:
transmitting, by the first SCP subsystem via a first unsecured communication channel, first data communications with the second SCP subsystem; and
transmitting, by the first SCP subsystem via a second unsecured communication channel, second data communications with the third SCP subsystem.

19. The method of claim 14, wherein the attestation of the authentication of the third SCP subsystem includes:
a third public key associated with the third SCP subsystem; and
third SCP subsystem communication connection information.

20. The method of claim 14, further comprising
receiving, by the first SCP subsystem from the third SCP subsystem via the second secure communication channel, an attestation of an authentication of a fourth SCP subsystem that established a fourth secure communication channel between the third SCP subsystem and the fourth SCP subsystem and, in response, establishing a fifth secure communication channel with the fourth SCP subsystem without performing the signed communication secure communication channel establishment procedure with the fourth SCP subsystem.

* * * * *

UNITED STATES PATENT AND TRADEMARK OFFICE
CERTIFICATE OF CORRECTION

| | | |
|---|---|---|
| PATENT NO. | : 11,683,172 B2 | Page 1 of 1 |
| APPLICATION NO. | : 17/079737 | |
| DATED | : June 20, 2023 | |
| INVENTOR(S) | : Pike et al. | |

It is certified that error appears in the above-identified patent and that said Letters Patent is hereby corrected as shown below:

In the Specification

Column 8, Lines 25-26, "Out-Of-Band (00B)" should read --Out-Of-Band (OOB)--

In the Claims

Column 23, Lines 9-10, Claim 1, "between the SCP subsystem and the third SCP subsystem" should be changed to --between the second SCP subsystem and the third SCP subsystem--

Signed and Sealed this
Nineteenth Day of September, 2023

*Katherine Kelly Vidal*

Katherine Kelly Vidal
*Director of the United States Patent and Trademark Office*